US011264881B2

(12) United States Patent
Tsuchihashi et al.

(10) Patent No.: US 11,264,881 B2
(45) Date of Patent: Mar. 1, 2022

(54) ACTUATOR HAVING A CONTACTED PART WITH INCREASED STRENGTH FOR RESTRICTING A MOVABLE RANGE OF A MOVABLE BODY

(71) Applicant: NIDEC SANKYO CORPORATION, Nagano (JP)

(72) Inventors: Masao Tsuchihashi, Nagano (JP); Tadashi Takeda, Nagano (JP); Hiroshi Kitahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 164 days.

(21) Appl. No.: 16/627,336

(22) PCT Filed: Jun. 11, 2018

(86) PCT No.: PCT/JP2018/022173
§ 371 (c)(1),
(2) Date: Dec. 30, 2019

(87) PCT Pub. No.: WO2019/003877
PCT Pub. Date: Jan. 3, 2019

(65) Prior Publication Data
US 2020/0161954 A1 May 21, 2020

(30) Foreign Application Priority Data

Jun. 30, 2017 (JP) .............................. JP2017-128804
Jun. 30, 2017 (JP) .............................. JP2017-128805
(Continued)

(51) Int. Cl.
H02K 33/16 (2006.01)

(52) U.S. Cl.
CPC .................................. H02K 33/16 (2013.01)

(58) Field of Classification Search
CPC .......... H02K 1/34; H02K 33/16; H02K 35/00; H02K 35/02; H02K 35/04
(Continued)

(56) References Cited

U.S. PATENT DOCUMENTS 8,198,760 B2 6/2012 Sugita et al.
2010/0231060 A1* 9/2010 Bang ...................... H02K 33/16
310/25

(Continued)

FOREIGN PATENT DOCUMENTS

CN 101771323 7/2010
CN 102761227 10/2012
(Continued)

OTHER PUBLICATIONS

Miyamoto, Machine Translation of JP2011205870, Oct. 2011 (Year: 2011).*
(Continued)

Primary Examiner — Quyen P Leung
Assistant Examiner — Eric Johnson
(74) Attorney, Agent, or Firm — JCIPRNET

(57) ABSTRACT

In a magnetic drive circuit of an actuator, a first yoke and a second yoke are disposed on both sides in a first direction across a coil, and a first magnet and a second magnet are fixed to the first yoke and the second yoke. The first yoke includes a first connecting plate part and a second connecting plate part that extend toward the second yoke. Thus, welding of the first connecting plate part and the second yoke and the second connecting plate part and the second yoke can be efficiently performed on a different side in the first direction (a side where the second yoke is located).

19 Claims, 8 Drawing Sheets

(30) Foreign Application Priority Data

Jun. 30, 2017 (JP) .............................. JP2017-128806
Jun. 30, 2017 (JP) .............................. JP2017-128807

(58) Field of Classification Search
USPC .......................................... 310/15–17, 19–39
See application file for complete search history.

(56) References Cited

U.S. PATENT DOCUMENTS

| | | | | |
|---|---|---|---|---|
| 2011/0101796 A1* | 5/2011 | Odajima | ............... | H02K 33/16 |
| | | | | 310/25 |
| 2013/0099602 A1* | 4/2013 | Park | ............ | H02K 33/16 |
| | | | | 310/25 |
| 2017/0012513 A1* | 1/2017 | Xu | ............... | H02K 41/0356 |
| 2017/0149321 A1* | 5/2017 | Kato | ............ | H02K 35/02 |
| 2017/0310203 A1 | 10/2017 | Takeda et al. | | |
| 2019/0044425 A1* | 2/2019 | Zu | ............ | H02K 33/18 |
| 2019/0068038 A1* | 2/2019 | Sato | ............ | H02K 33/12 |
| 2019/0081543 A1* | 3/2019 | Zhu | ............ | H02K 33/02 |

FOREIGN PATENT DOCUMENTS

| | | | | |
|---|---|---|---|---|
| CN | 105529896 A | * | 4/2016 | |
| CN | 105591512 A | * | 5/2016 | |
| CN | 106471719 | | 3/2017 | |
| JP | 2002200460 A | * | 7/2002 | |
| JP | 2005237078 | | 9/2005 | |
| JP | 2011097747 | | 5/2011 | |
| JP | 2011205870 A | * | 10/2011 | |
| JP | 2012147517 | | 8/2012 | |
| JP | 2014107996 | | 6/2014 | |
| JP | 2016-127789 | | 7/2016 | |
| JP | 2017060207 | | 3/2017 | |
| KR | 20120018405 A | * | 3/2012 | |
| KR | 20120033038 A | * | 4/2012 | |
| WO | WO-2010103929 A1 | * | 9/2010 | |

OTHER PUBLICATIONS

Maruo, Machine Translation of JP2002200460, Jul. 2002 (Year: 2002).*

Honma, Machine Translation of WO2010103929, Sep. 2010 (Year: 2010).*

Lee, Machine Translation of KR20120018405, Mar. 2012 (Year: 2012).*

Lee, Machine Translation of KR20120033038, Apr. 2012 (Year: 2012).*

"International Search Report (Form PCT/ISA/210)" of PCT/JP2018/022173, dated Aug. 28, 2018, with English translation thereof, pp. 1-3.

Office Action of China Counterpart Application, with English translation thereof, dated Jun. 17, 2021, pp. 1-23.

"Office Action of China Counterpart Application", dated Jan. 6, 2021, with English translation thereof, pp. 1-32.

* cited by examiner

ACTUATOR HAVING A CONTACTED PART WITH INCREASED STRENGTH FOR RESTRICTING A MOVABLE RANGE OF A MOVABLE BODY

CROSS-REFERENCE TO RELATED APPLICATION

This application is a 371 application of the international PCT application serial no. PCT/JP2018/022173, filed on Jun. 11, 2018, which claims the priority benefits of Japan application no. 2017-128804 filed on Jun. 30, 2017, Japan application no. 2017-128805 filed on Jun. 30, 2017, Japan application no. 2017-128806 filed on Jun. 30, 2017, and Japan application no. 2017-128807 filed on Jun. 30, 2017. The entirety of each of the abovementioned patent applications is hereby incorporated by reference herein and made a part of this specification.

TECHNICAL FIELD

The present invention relates to an actuator that generates various vibrations.

BACKGROUND ART

As a device that generates vibration by a magnetic drive mechanism, there is suggested an actuator that vibrates a movable body in a second direction intersecting a first direction with respect to a support body by a magnetic drive circuit equipped with a coil and a magnet facing each other in the first direction (see Patent Literature 1). In the actuator described in Patent Literature 1, a yoke provided on the support body is composed of a unitary magnetic plate folded in a U-shape in such a manner that a first plate part and a second plate part face each other, and a permanent magnet is held on each of the surface of the first plate part on the second plate part side and the surface of the second plate part on the first plate part side. In addition, a coil held on the movable body is disposed between the magnet held on the first plate part and the magnet held on the second plate part.

Moreover, in the actuator described in Patent Literature 1, a viscoelastic member composed of a gel-like damper member is disposed between the movable body and the support body, and the movable body is supported on the support body via the viscoelastic member, and the resonance when the movable body is driven is suppressed. More specifically, in the support body, a first cover member, a holder holding the magnet, and a second cover member are stacked and disposed in the first direction, and the viscoelastic member is disposed between the first cover member and the movable body and between the second cover member and the movable body.

Furthermore, as a device that generates vibration by a magnetic drive mechanism, there is suggested an actuator that vibrates a movable body in a second direction intersecting a first direction with respect to a support body by a magnetic drive circuit equipped with a coil and a magnet facing each other in the first direction (see Patent Literature 1). In the actuator described in Patent Literature 1, in one of a first cover member and a second cover member, a plurality of prismatic parts are formed, and the prismatic parts contact the movable body to restrict a movable range of the movable body to a one side in the second direction when the movable body moves to the one side in the second direction. In addition, the prismatic parts contact the movable body to restrict a movable range of the movable body to a different side in the second direction when the movable body moves to the other side in the second direction.

CITATION LIST

Patent Literature

Patent Literature 1: Japanese Unexamined Patent Publication No. 2016-127789

SUMMARY

Problems to be Solved by the Invention

However, for a yoke bent into a U-shape as in the actuator described in Patent Literature 1, it is difficult to efficiently manufacture a yoke in which a magnet is fixed to surfaces facing each other in a first plate part and a second plate part, such as taking a lot of work to fix a magnet on the surface of the first plate part that faces the second plate part or the surface of the second plate part that faces the first plate part.

In view of the above problem, a first object of the present invention is to provide an actuator for which a yoke in which a magnet is fixed to surfaces facing each other in a first plate part and a second plate part can be efficiently manufactured.

In addition, as the actuator described in Patent Literature 1, the first cover member, holder, and second cover member are stacked and disposed in the first direction, and thus an interval between the first cover member and the movable body in the first direction and an interval between the second cover member and the movable body in the first direction may vary. In this case, a gap may be generated between the viscoelastic member and the first cover member, between the viscoelastic member and the movable body, or between the viscoelastic member and the second cover member. If such gap is generated, the resonance when the movable body is driven will not be suppressed.

In view of the above problem, a second object of the present invention is to provide an actuator for which a viscoelastic member can be properly disposed between a support body and a movable body.

Moreover, as the actuator described in Patent Literature 1, when the prismatic parts formed on the cover member are used as a contacted part that restricts the movable range of the movable body, the strength of the prismatic parts (contacted part) is small, and thus there is a problem that the prismatic parts are damaged when the movable body rapidly moves due to an impact when dropped or the like.

In view of the above problem, a third object of the present invention is to provide an actuator for which the strength of a contacted part that restricts a movable range of a movable body can be increased.

Furthermore, in the actuator described in Patent Literature 1, if an end at the beginning of winding and an end at the end of winding of a coil wire are each left being pulled out to the outside of the cover, the ends of the coil wire may be pulled and the coil may be damaged.

In view of the above problem, a fourth problem of the present invention is to provide an actuator for which an end of a coil can be properly processed.

Means for Solving the Problem

In order to solve the above problem, an actuator to which a first aspect of the invention is applied includes: a support body; a movable body; a connection body connected to the movable body and the support body and having at least one of elasticity and viscoelasticity; and a magnetic drive circuit relatively moving the movable body with respect to the support body. The magnetic drive circuit includes a coil provided on an either one side member of the support body and the movable body and a first magnet provided on a different side member of the support body and the movable body and facing the coil in a first direction, and drives the movable body in a second direction intersecting the first direction. The other side member includes a first yoke including a first plate part facing the coil on a one side in the first direction and a second yoke including a second plate part facing the coil on a different side in the first direction. The first magnet is fixed to one of a surface of the first plate part facing the coil and a surface of the second plate part facing the coil. The first yoke includes: a first connecting plate part that extends from the first plate part toward the other side in the first direction to a position overlapping the second yoke and that is connected to the second yoke; and a second connecting plate part that extends from the first plate part toward the other side in the first direction to a position overlapping the second yoke and that is connected to the second yoke, on a side opposite to the first connecting plate part with respect to the first magnet.

In the first aspect of the invention, the first magnet is fixed to one of the first plate part and the second plate part facing each other in the first direction in the yoke, and the yoke includes a first yoke including the first plate part and a second yoke including the second plate part. Thus, if the first magnet and the second yoke are connected after fixing the first magnet, a yoke in which the magnet is fixed to the surfaces facing each other in the first plate part and the second plate part can be manufactured. In addition, the first yoke includes the first connecting plate part and the second connecting plate part extending toward the second yoke, and thus, the first connecting plate part and the second yoke can be connected, and the second connecting plate part and the second yoke can be connected on the other side in the first direction (the side where the second yoke is located). Consequently, a yoke in which the magnet is fixed to the surfaces facing each other in the first plate part and the second plate part can be efficiently manufactured.

In the first aspect of the invention, an aspect can be employed in which the first connecting plate part and the second connecting plate part are each bent from an end located on opposite sides of the first plate part toward the other side in the first direction. According to such an aspect, the first yoke can be efficiently manufactured.

In the first aspect of the invention, an aspect can be employed in which the magnetic drive circuit includes a second magnet fixed to the surface of the first plate part facing the coil and a different side of the surface of the second plate part facing the coil. According to such an aspect, the power of the magnetic drive circuit can be increased. Even in this case, after the first magnet and the second magnet are fixed to the first plate part and the second plate part and the first yoke and the second yoke are connected, a yoke in which the magnet is fixed to the surfaces facing each other in the first plate part and the second plate part can be manufactured. In the present invention, an aspect in which the first connecting plate part and the second connecting plate part are connected to the second yoke by welding can be employed.

In the first aspect of the invention, an aspect can be employed in which an end on the other side in the first direction of the first connecting plate part overlaps a first side surface of the second plate part, and the first connecting plate part and the first side surface of the second yoke are welded, and an end on the other side in the first direction of the second connecting plate part overlaps a second side surface of the second plate part, and the second connecting plate part and the second side surface of the second yoke are welded. According to such an aspect, since welding can be performed from the other side in the first direction, welding work can be efficiently performed.

In the first aspect of the invention, an aspect can be employed in which in either one of the end on the other side in the first direction of the first connecting plate part and the first side surface, a protruding part fitted and welded into a recessed part formed on the other is formed, and in either one of the end on the other side in the first direction of the second connecting plate part and the second side surface, a protruding part fitted and welded into a recessed part formed on the other is formed. According to such an aspect, the first yoke and the second yoke can be joined together in a state of being positioned by the recessed parts and the protruding parts.

In the first aspect of the invention, an aspect can be employed in which the first connecting plate part extends toward the other side in the first direction through a one side in the second direction with respect to the coil, and the second connecting plate part extends toward the other side in the first direction through a different side in the second direction with respect to the coil.

In the first aspect of the invention, an aspect can be employed in which the coil is held in a holder, the first connecting plate part constitutes a first stopper that contacts the holder to restrict a movable range of the movable body to a one side in the second direction when the movable body moves to the one side in the second direction, and the second connecting plate part constitutes a second stopper that contacts the holder to restrict a movable range of the movable body to a different side in the second direction when the movable body moves to the other side in the second direction. In this case, an aspect can be employed in which the holder is formed with an opening through which the first connecting plate part and the second connecting plate part pass from the one side toward the other side in the first direction.

In the first aspect of the invention, an aspect can be employed in which the one side member is the support body, the other side member is the movable body, and the support body includes a cover member whose ends overlap each other in the first direction with respect to the holder. According to such an aspect, the support body can be configured by stacking the cover member on the holder.

In the first aspect of the invention, an aspect can be employed in which the holder and the cover member are formed with a positioning protruding part that protrudes from either one of the holder and the cover member toward the other and fits into a positioning hole formed on the other. According to such an aspect, the holder and the cover member can be positioned.

In the first aspect of the invention, an aspect in which a viscoelastic member is used as the connection body can be employed. In this case, an aspect in which only the viscoelastic member is used as the connection body can be employed. In the present invention, an aspect in which the viscoelastic member is fixed to both the movable body and the support body can be employed. In the present invention, an aspect in which the viscoelastic member is a gel-like member can be employed. In the present invention, an aspect in which the gel-like member is a silicone-based gel can be employed. In the present invention, an aspect in which the viscoelastic member is disposed at a position where the support body and the movable body face each other in the first direction.

According to such an aspect, when the movable body moves, the elastic member deforms in a direction (shear direction) intersecting a thickness direction (axial direction). Thus, since the deformation is in a direction of being pulled and stretched regardless of a direction of movement, the viscoelastic member has a deformation property in which a linear component (spring coefficient) is larger than a non-linear component (spring coefficient). Therefore, the viscoelastic member has a constant spring force due to the direction of movement. Accordingly, the reproducibility of vibration acceleration for an input signal can be improved by using a spring element in the shear direction of the viscoelastic member, and thus a vibration with a subtle nuance can be achieved.

In order to solve the above problem, an actuator to which a second aspect of the invention is applied includes: a support body; a movable body; a viscoelastic member connected to the movable body and the support body; and a magnetic drive circuit that includes a coil and a magnet facing the coil in a first direction, and that relatively moves the movable body with respect to the support body in a second direction intersecting the first direction. The viscoelastic member is disposed in a state of being compressed in the first direction at a location where the support body and the movable body face each other in the first direction.

In the second aspect of the invention, the viscoelastic member is disposed at a location where the support body and the movable body face each other in the first direction, and the magnetic drive circuit drives the movable body in the second direction intersecting the first direction. In doing so, the elastic member deforms in a direction (shear direction) intersecting a thickness direction (axial direction). Thus, since the deformation is in a direction of being pulled and stretched regardless of a direction of movement, the viscoelastic member has a deformation property in which a linear component (spring coefficient) is larger than a non-linear component (spring coefficient). Therefore, the viscoelastic member has a constant spring force due to the direction of movement. Accordingly, the reproducibility of vibration acceleration for an input signal can be improved by using a spring element in the shear direction of the viscoelastic member, and thus a vibration with a subtle nuance can be achieved. In addition, since the viscoelastic member is disposed in a compressed state in the first direction, the viscoelastic member reliably follows the movement of the movable body. Therefore, the resonance of the movable body can be effectively prevented.

In the second aspect of the invention, an aspect can be employed in which the support body comprises a plurality of members stacked in the first direction, and the viscoelastic member is disposed between any of the plurality of members and the movable body. In a case of such a configuration, in the support body, an interval between the locations where the support body and the movable body face each other in the first direction is likely to vary. However, since the viscoelastic member is disposed in a compressed state in the first direction, the viscoelastic member reliably follows the movement of the movable body.

In the second aspect of the invention, an aspect can be employed in which the support body comprises, as the plurality of members: a holder holding a coil or a magnet that constitutes the magnetic drive circuit; a first cover member whose ends overlap each other on a one side in the first direction with respect to the holder; and a second cover member whose ends overlap each other on a different side in the first direction with respect to the holder, and the viscoelastic member is provided between the movable body and the first cover member and between the movable body and the second cover member. In a case of such a configuration, in particular, since the dimensions of the locations where the viscoelastic member is disposed (between the movable body and the first cover member and between the movable body and the second cover member) are likely to vary, the effect by applying the present invention is remarkable.

In the second aspect of the invention, an aspect can be employed in which the coil is held in the holder, and the magnet faces the coil in the first direction on a side of the movable body.

In the second aspect of the invention, an aspect can be employed in which the first cover member, the holder, and the second cover member are fastened in the first direction by a screw having a screw shaft extending in the first direction. According to such an aspect, the viscoelastic member can be compressed in the first direction when fastening the first cover member, holder, and second cover member by tightening the screw.

In the second aspect of the invention, an aspect can be employed in which the magnetic drive circuit includes a coil provided on the support body and a magnet provided on the movable body and facing the coil in the first direction.

In the second aspect of the invention, an aspect can be employed in which a portion of the support body that contacts the viscoelastic member is a recessed part. According to such an aspect, the position of the viscoelastic member is difficult to shift.

In the second aspect of the invention, an aspect can be employed in which a surface of the viscoelastic member in contact with the support body is bonded to the support body, and a surface of the viscoelastic member in contact with the movable body is bonded to the movable body. According to such an aspect, the position of the viscoelastic member is difficult to shift.

In the second aspect of the invention, an aspect in which the viscoelastic member is a gel-like member can be employed.

In the second aspect of the invention, an aspect in which the gel-like member is a silicone-based gel can be employed.

In order to solve the above problem, an actuator to which a third aspect of the invention is applied includes: a support body; a movable body; a connection body connected to the movable body and the support body and having at least one of elasticity and viscoelasticity; and a magnetic drive circuit that includes a coil and a first magnet facing the coil in a first direction, and that relatively moves the movable body with respect to the support body in a second direction intersecting the first direction. The support body includes: a first wall part facing the movable body on a one side in the second direction; a second wall part facing the movable body faces on a different side in the second direction; a third wall part facing the movable body on a one side in a third direction intersecting the first direction and the second direction; and a fourth wall part facing the movable body on a different side in the third direction. A width in the second direction of the first wall part and the second wall part is wider than a width in the third direction of the third wall part and the fourth wall part. The first wall part includes a first contacted part that contacts the movable body to restrict a movable range of the movable body to a one side in the second direction when the movable body moves to the one side in the second direction. The second wall part includes a second contacted part that contacts the movable body to restrict a movable range of the movable body to a different side in the second direction when the movable body moves to the other side in the second direction.

In the third aspect of the invention, the support body is used as a contacted part (a first contacted part and a second contacted part) that contacts the movable body to restrict a movable range of the movable body in the second direction when the movable body moves in the second direction in the first wall part and second wall part facing the movable body on the one side and the other side in the second direction. Here, a width in the second direction of the first wall part and the second wall part is wider than a width in the third direction of the third wall part and the fourth wall part, and the strength is large. Therefore, even if the movable body rapidly moves in the second direction due to an impact when dropped or the like, the contacted part (the first contacted part and the second contacted part) is not easily damaged.

In the third aspect of the invention, an aspect can be employed in which the support body includes: a holder holding the coil or the first magnet; a first cover member whose ends overlap each other on a one side in the first direction with respect to the holder; and a second cover member whose ends overlap each other on a different side in the first direction with respect to the holder, and the first wall part and the second wall part each include a portion where the holder, the first cover member, and the second cover member overlap one another in the first direction. According to such an aspect, in the first wall part and the second wall part, a portion where the holder, first cover member, and second cover member overlap one another in the first direction can be used as a contacted part (a first contacted part and a second contacted part), the strength of the contacted part (the first contacted part and the second contacted part) is large.

In the third aspect of the invention, an aspect can be employed in which the holder and the first cover member are formed with a positioning protruding part that protrudes from either one of the holder and the first cover member toward the other and fits into a positioning hole formed on the other, and the holder and the second cover member are formed with a positioning protruding part that protrudes from either one of the holder and the second cover member toward the other and fits into a positioning hole formed on the other. According to such an aspect, the holder and the first cover member can be positioned, and the holder and the second cover member can be positioned.

In the third aspect of the invention, an aspect can be employed in which the coil is provided on a side of the support body in a state of being held by the holder, the first magnet is provided on the movable body, the movable body includes a first yoke including a first plate part facing the coil on the one side in the first direction and a second yoke including a second plate part facing the coil on the other side in the first direction, the first magnet is fixed to one of a surface of the first plate part facing the coil and a surface of the second plate part facing the coil, the first yoke includes: a first connecting plate part that extends from the first plate part toward the other side in the first direction to a position overlapping the second yoke and that is connected to the second yoke, on the one side in the second direction with respect to the coil; and a second connecting plate part that extends from the first plate part toward the other side in the first direction to a position overlapping the second yoke and that is connected to the second yoke, on the other side in the second direction with respect to the coil, the first connecting plate part contacts the first wall part to restrict a movable range of the movable body to the one side in the second direction when the movable body moves to the one side in the second direction, and the second connecting plate part contacts the second wall part to restrict a movable range of the movable body to the other side in the second direction when the movable body moves to the other side in the second direction. According to such an aspect, the first magnet is fixed to one of the first plate part and the second plate part facing each other in the first direction in the yoke, and the yoke includes a first yoke including the first plate part and a second yoke including the second plate part. Thus, if the first magnet and the second yoke are connected after fixing the first magnet, a yoke in which the magnet is fixed to the surfaces facing each other in the first plate part and the second plate part can be manufactured. In addition, the first yoke includes the first connecting plate part and the second connecting plate part extending from the first yoke toward the second yoke, and thus, the first connecting plate part and the second yoke can be connected, and the second connecting plate part and the second yoke can be connected on the one side in the first direction (the side where the second yoke is located). Consequently, a yoke in which the magnet is fixed to the surfaces facing each other in the first plate part and the second plate part can be efficiently manufactured. Moreover, a stopper that restricts the movable range of the movable body in the second direction can be configured with the use of the first connecting plate part and the second connecting plate part, and thus the configuration can be simplified.

In the third aspect of the invention, an aspect in which the first connecting plate part and the second connecting plate part are connected to the second yoke by welding can be employed. According to such an embodiment, since the first connecting plate part and the second connecting plate part are firmly connected to the second yoke, a stopper that restricts the movable range of the movable body in the second direction can be configured with the use of the first connecting plate part and second connecting plate part.

In the third aspect of the invention, an aspect can be employed in which the holder is formed with: a first opening part that allows the first connecting plate part to pass through from the one side toward the other side in the first direction, between the coil and the first wall part; and a second opening part that allows the second connecting plate part to pass through from the one side toward the other side in the first direction, between the coil and the second wall part. According to such an aspect, the first connecting plate part and the second connecting plate part can be extended to a position overlapping the second yoke with a simple configuration.

In the third aspect of the invention, an aspect can be employed in which the magnetic drive circuit includes a second magnet fixed to the surface of the first plate part facing the coil and a different side of the surface of the second plate part facing the coil. According to such an aspect, the power of the magnetic drive circuit can be increased. Even in this case, after the first magnet and the second magnet are fixed to the first plate part and the second plate part and the first yoke and the second yoke are connected, a yoke in which the magnet is fixed to the surfaces facing each other in the first plate part and the second plate part can be manufactured.

In the third aspect of the invention, an aspect can be employed in which a plurality of through holes are formed through the first cover member, the first yoke, the holder, and the second yoke, in a state where the first cover member, the first yoke, the holder, and the second yoke are stacked in the first direction. According to such an aspect, when assembling the actuator, a pin is inserted into each of the plurality of through holes, and the first yoke, holder and second yoke can be stacked in order in the first direction on the first cover member.

In the third aspect of the invention, an aspect in which a viscoelastic member is used as the connection body can be employed. In this case, an aspect in which only the viscoelastic member is used as the connection body can be employed. In the present invention, an aspect in which the viscoelastic member is fixed to both the movable body and the support body can be employed. In the present invention, an aspect in which the viscoelastic member is a gel-like member can be employed. In the present invention, an aspect in which the gel-like member is a silicone-based gel can be employed.

In the third aspect of the invention, an aspect can be employed in which the viscoelastic member is disposed at a position where the support body and the movable body face each other in the first direction. According to such an aspect, the elastic member deforms in a direction (shear direction) intersecting a thickness direction (axial direction). Thus, since the deformation is in a direction of being pulled and stretched regardless of a direction of movement, the viscoelastic member has a deformation property in which a linear component (spring coefficient) is larger than a non-linear component (spring coefficient). Therefore, the viscoelastic member has a constant spring force due to the direction of movement. Accordingly, the reproducibility of vibration acceleration for an input signal can be improved by using a spring element in the shear direction of the viscoelastic member, and thus a vibration with a subtle nuance can be achieved.

In order to solve the above problem, an actuator to which a fourth aspect of the invention is applied includes: a support body; a movable body; a connection body connected to the movable body and the support body and having at least one of elasticity and viscoelasticity; and a magnetic drive circuit that includes a coil and a first magnet facing the coil in a one side in a first direction, and that relatively moves the movable body with respect to the support body in a direction intersecting the first direction. The support body includes, on an outer surface side: a first side surface located on a one side in a second direction intersecting the first direction; a second side surface located on a different side in the second direction; a third side surface which is located on a one side in a third direction intersecting the first direction and the second direction, a length in the second direction of which being longer than a length in the third direction of the first side surface and the second side surface; and a fourth side surface which is located on a different side in the third direction, a length in the second direction of which being longer than the length in the third direction of the first side surface and the second side surface. A wiring board to which a first end at the beginning of winding and a second end at the end of winding of a coil wire constituting the coil are each electrically connected is fixed to the third side surface.

In the fourth aspect of the invention, since the coil wire is in the state of being electrically connected to the wiring board fixed to the third side surface of the support body, a situation where the ends of the coil wire is pulled and the coil is damaged is hard to occur. In addition, since the wiring board is fixed to the third side surface corresponding to the long side when viewed from the first direction among the side surfaces of the support body, it is possible to use the wiring board having a long dimension. Thus, regardless of the orientation, position, number, or the like of the coil, even if the first end and second end of the coil are not routed over a long distance, the ends of the coil can be properly processed, such as being easily electrically connected to the wiring board.

In the fourth aspect of the invention, an aspect can be employed in which the third side surface is formed with a hole through which the first end and the second end are passed, and the first end and the second end are connected to the wiring board through the hole. According to such an aspect, it is easy to route the first end and the second end to the wiring board.

In the fourth aspect of the invention, an aspect can be employed in which the coil is disposed in such a manner that a long side extends in the third direction, and the magnetic drive circuit drives the movable body in the second direction.

In the fourth aspect of the invention, an aspect can be employed in which a plurality of the coils are arranged so as to be in parallel in the second direction.

In the fourth aspect of the invention, an aspect can be employed in which the coil is held in a holder, and a guide groove through which the first end and the second end each pass is formed at an end in a one side in the third direction of the holder. According to such an aspect, it is easy to route the first end and the second end to the wiring board.

In the fourth aspect of the invention, an aspect can be employed in which the holder is formed with a coil holding hole in which the coil is housed.

In the fourth aspect of the invention, an aspect can be employed in which the magnetic drive circuit includes a second magnet facing the coil on a different side in the first direction.

In the fourth aspect of the invention, an aspect in which a viscoelastic member is used as the connection body can be employed. In this case, an aspect in which only the viscoelastic member is used as the connection body can be employed.

In the fourth aspect of the invention, an aspect in which the viscoelastic member is fixed to both the movable body and the support body can be employed. In the present invention, an aspect in which the viscoelastic member is a gel-like member can be employed. In the present invention, an aspect in which the gel-like member is a silicone-based gel can be employed.

In the fourth aspect of the invention, an aspect can be employed in which the viscoelastic member is disposed at a position where the support body and the movable body face each other in the first direction. According to such an aspect, the elastic member deforms in a direction (shear direction) intersecting a thickness direction (axial direction). Thus, since the deformation is in a direction of being pulled and stretched regardless of a direction of movement, the viscoelastic member has a deformation property in which a linear component (spring coefficient) is larger than a non-linear component (spring coefficient). Therefore, the viscoelastic member has a constant spring force due to the direction of movement. Accordingly, the reproducibility of vibration acceleration for an input signal can be improved by using a spring element in the shear direction of the viscoelastic member, and thus a vibration with a subtle nuance can be achieved.

Effect of the Invention

In the first aspect of the invention, the first magnet is fixed to one of the first plate part and the second plate part facing each other in the first direction in the yoke, and the yoke includes a first yoke including the first plate part and a second yoke including the second plate part. Thus, if the first magnet and the second yoke are connected after fixing the first magnet, a yoke in which the magnet is fixed to the surfaces facing each other in the first plate part and the second plate part can be manufactured. In addition, the first yoke includes the first connecting plate part and the second connecting plate part extending toward the second yoke, and thus, the first connecting plate part and the second yoke can be connected, and the second connecting plate part and the second yoke can be connected on the other side in the first direction (the side where the second yoke is located). Consequently, a yoke in which the magnet is fixed to the surfaces facing each other in the first plate part and the second plate part can be efficiently manufactured.

In the second aspect of the invention, the viscoelastic member is disposed at a location where the support body and the movable body face each other in the first direction, and the magnetic drive circuit drives the movable body in the second direction intersecting the first direction. Thus, the resonance when the movable body is driven is suppressed by the viscoelastic member. In doing so, since the viscoelastic member is deformed in the shear direction, the viscoelastic member has a deformation property in which a linear component is larger than a non-linear component. Therefore, the resonance of the movable body can be effectively prevented by the viscoelastic member. In addition, since the viscoelastic member is disposed in a compressed state in the first direction, the viscoelastic member reliably follows the movement of the movable body, and thus the resonance of the movable body can be effectively prevented.

In the third aspect of the invention, the support body is used as a contacted part (a first contacted part and a second contacted part) that contacts the movable body to restrict a movable range of the movable body in the second direction when the movable body moves in the second direction in the first wall part and second wall part facing the movable body on the one side and the other side in the second direction. Here, a width in the second direction of the first wall part and the second wall part is wider than a width in the third direction of the third wall part and the fourth wall part, and the strength is large. Therefore, even if the movable body rapidly moves in the second direction due to an impact when dropped or the like, the contacted part (the first contacted part and the second contacted part) is not easily damaged.

In the fourth aspect of the invention, since the coil wire is in the state of being electrically connected to the wiring board fixed to the third side surface of the support body, a situation where the ends of the coil wire is pulled and the coil is damaged is hard to occur. In addition, since the wiring board is fixed to the third side surface corresponding to the long side when viewed from the first direction among the side surfaces of the support body, it is possible to use the wiring board having a long dimension. Thus, regardless of the orientation, position, number, or the like of the coil, even if the first end and second end of the coil are not routed over a long distance, the ends of the coil can be properly processed, such as being easily electrically connected to the wiring board.

DESCRIPTION OF EMBODIMENTS

Figure 1:
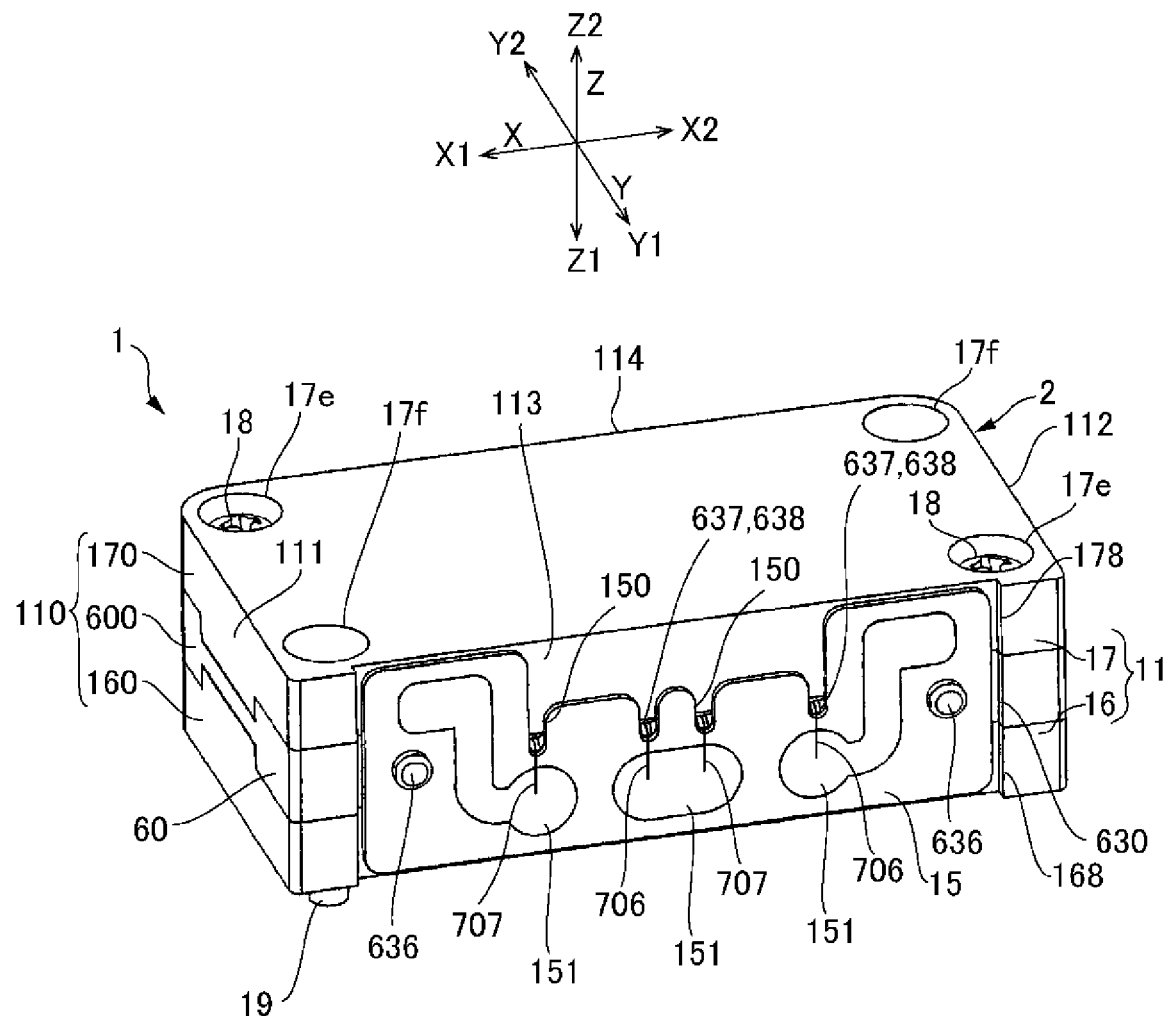
FIG. 1 is a perspective view of an actuator according to an embodiment of the present invention.

Embodiments of the first aspect of the invention, second aspect of the invention, third aspect of the invention and fourth aspect of the invention will be described with reference to the drawings. The embodiments of the first to fourth aspects are the same embodiments. Accordingly, the following description will be given as an embodiment of the present invention. In the following description, three directions intersecting each other are defined as a first direction Z, a second direction X, and a third direction Y, respectively. In addition, the first direction Z, second direction X, and third direction Y are orthogonal to each other. Moreover, in the description, a one side in the second direction X is denoted as X1, a different side in the second direction X is denoted as X2, a one side in the third direction Y is denoted as Y1, a different side in the third direction Y is denoted as Y2, a one side in the first direction Z is denoted as Z1, and a different side in the first direction Z is denoted as Z2.

In addition, an actuator 1 to which the present invention is applied includes a magnetic drive circuit 6 that relatively moves a movable body 3 with respect to a support body 2, and the magnetic drive circuit 6 includes a coil 7 and a magnet 8. In such a magnetic drive circuit 6, an aspect can be employed in which the coil 7 is provided on the support body 2 (one side member) side and the magnet 8 is provided on the movable body 3 (other side member) side, and an aspect can be employed in which the magnet 8 is provided on the support body 2 (other side member) side and the coil 7 is provided on the movable body 3 (one side member) side. In the following description, the description will focus on an aspect in which the coil 7 is provided on the support body 2 side and the magnet 8 is provided on the movable body 3 side.

(Overall Configuration)

Figure 2:
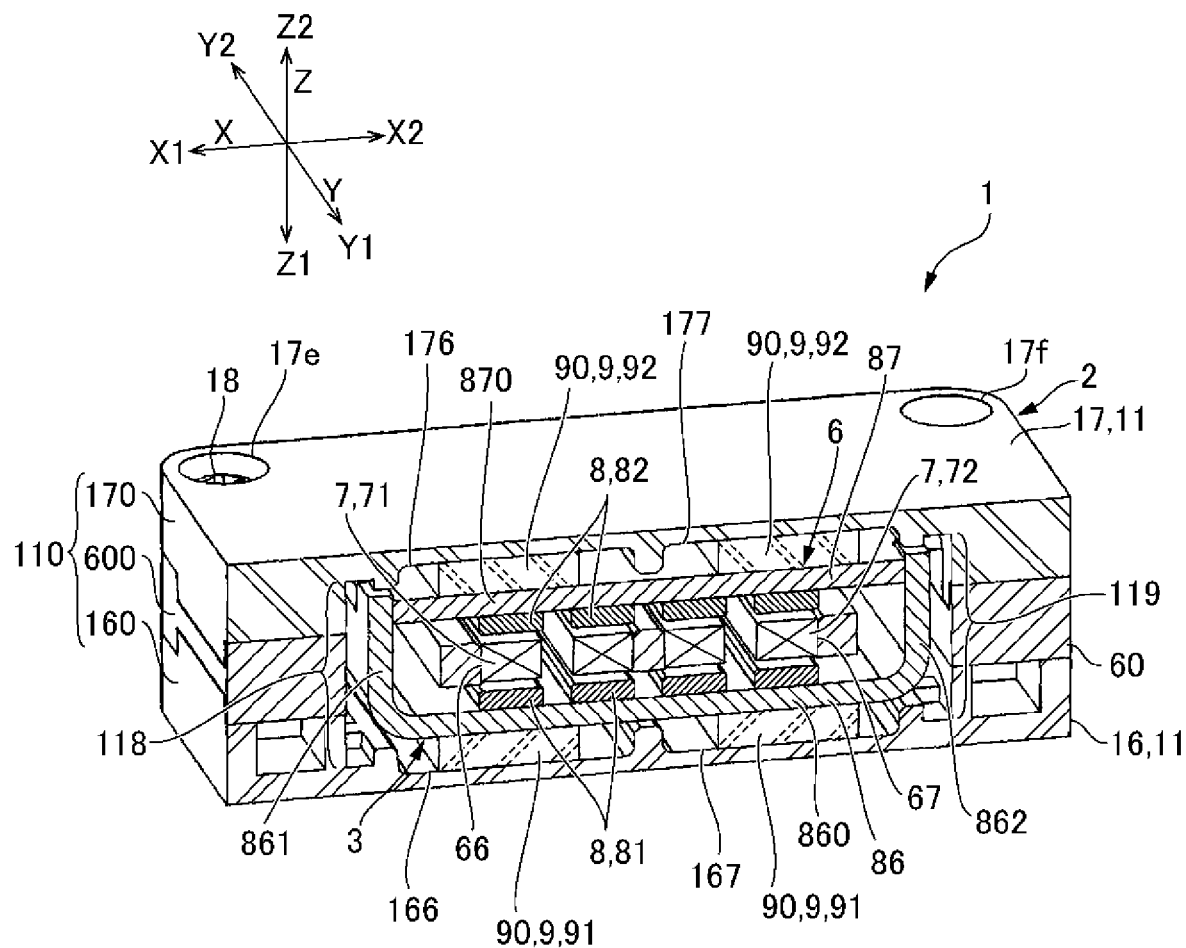
FIG. 2 is an XZ sectional view of the actuator illustrated in FIG. 1.
Figure 3:
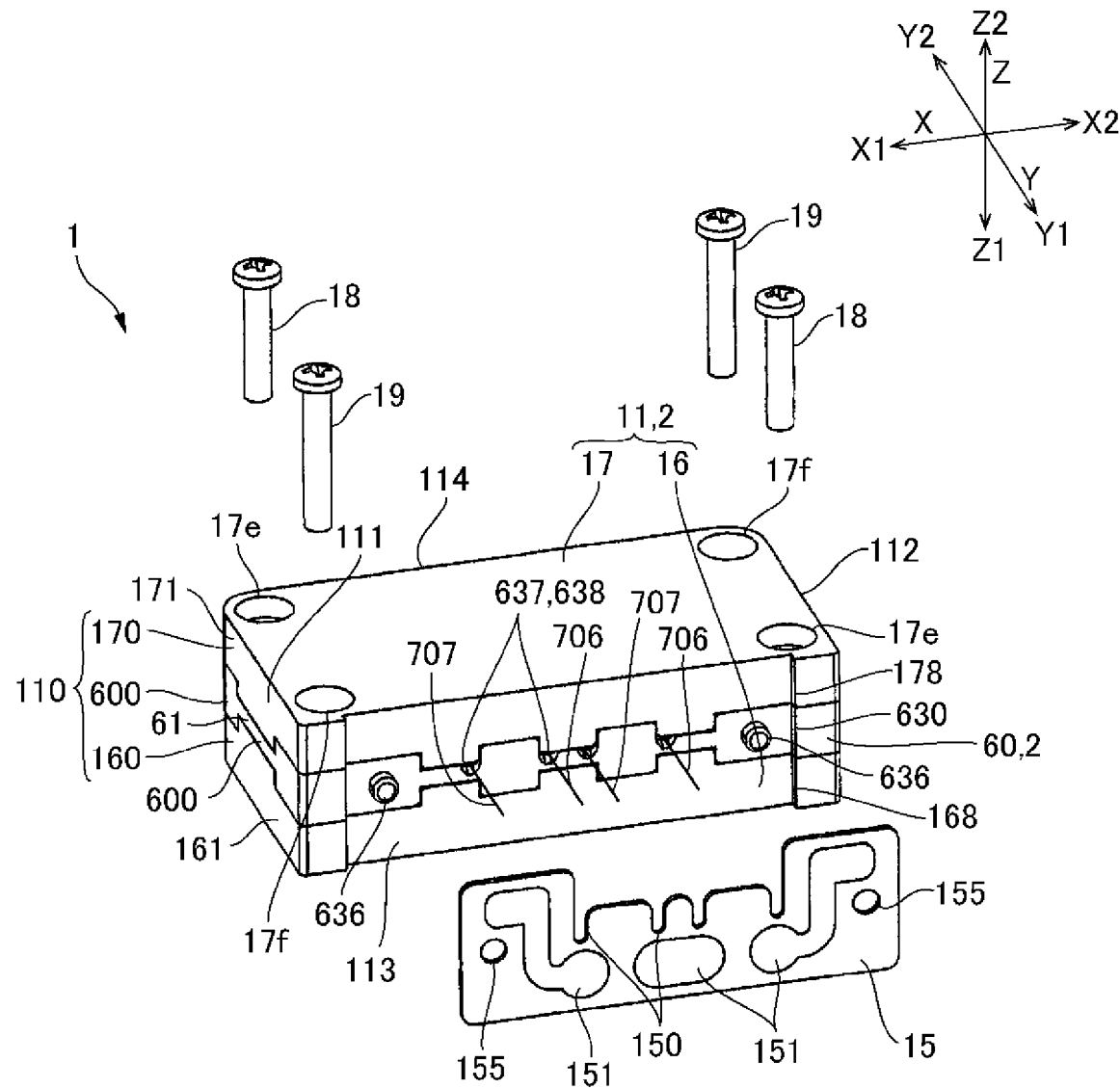
FIG. 3 is a perspective view of a state where a wiring board and a screw illustrated in FIG. 1 are removed.

FIG. 1 is a perspective view of an actuator 1 according to an embodiment of the present invention. FIG. 2 is an XZ sectional view of the actuator 1 illustrated in FIG. 1. FIG. 3 is a perspective view of a state where a wiring board and a screw illustrated in FIG. 1 are removed.

As illustrated in FIGS. 1 and 2, the actuator 1 of this embodiment has, as a whole, a rectangular parallelepiped shape in which a dimension in a second direction X is larger than a dimension in a third direction Y. In addition, as illustrated in FIG. 2, the actuator 1 includes a support body 2, a movable body 3 movably supported by the support body 2, and a magnetic drive circuit 6 that relatively moves the movable body 3 with respect to the support body 2. The magnetic drive circuit 6 vibrates the movable body 3 in the second direction X.

As illustrated in FIGS. 1, 2 and 3, the support body 2 includes a cover 11 and a holder 60, and the movable body 3 and the magnetic drive circuit 6 illustrated in FIG. 2 are disposed inside the cover 11. The cover 11 includes a first cover member 16 located on a one side Z1 in a first direction Z and a second cover member 17 overlapping the first cover member 16 from a different side Z2 in the first direction Z. The first cover member 16 and the second cover member 17 have a rectangular planar shape. Between the first cover member 16 and the second cover member 17, the holder 60 having a rectangular planar shape is provided. In the first cover member 16, holder 60 and second cover member 17, ends 160, 600 and 170 overlap in the first direction Z. Therefore, an outer surface side 110 of the cover 11 is composed of an end 160 of the first cover member 16, an end 600 of the holder 60, and an end 170 of the second cover member 17.

(Configuration of First Cover Member 16)

Figure 4:
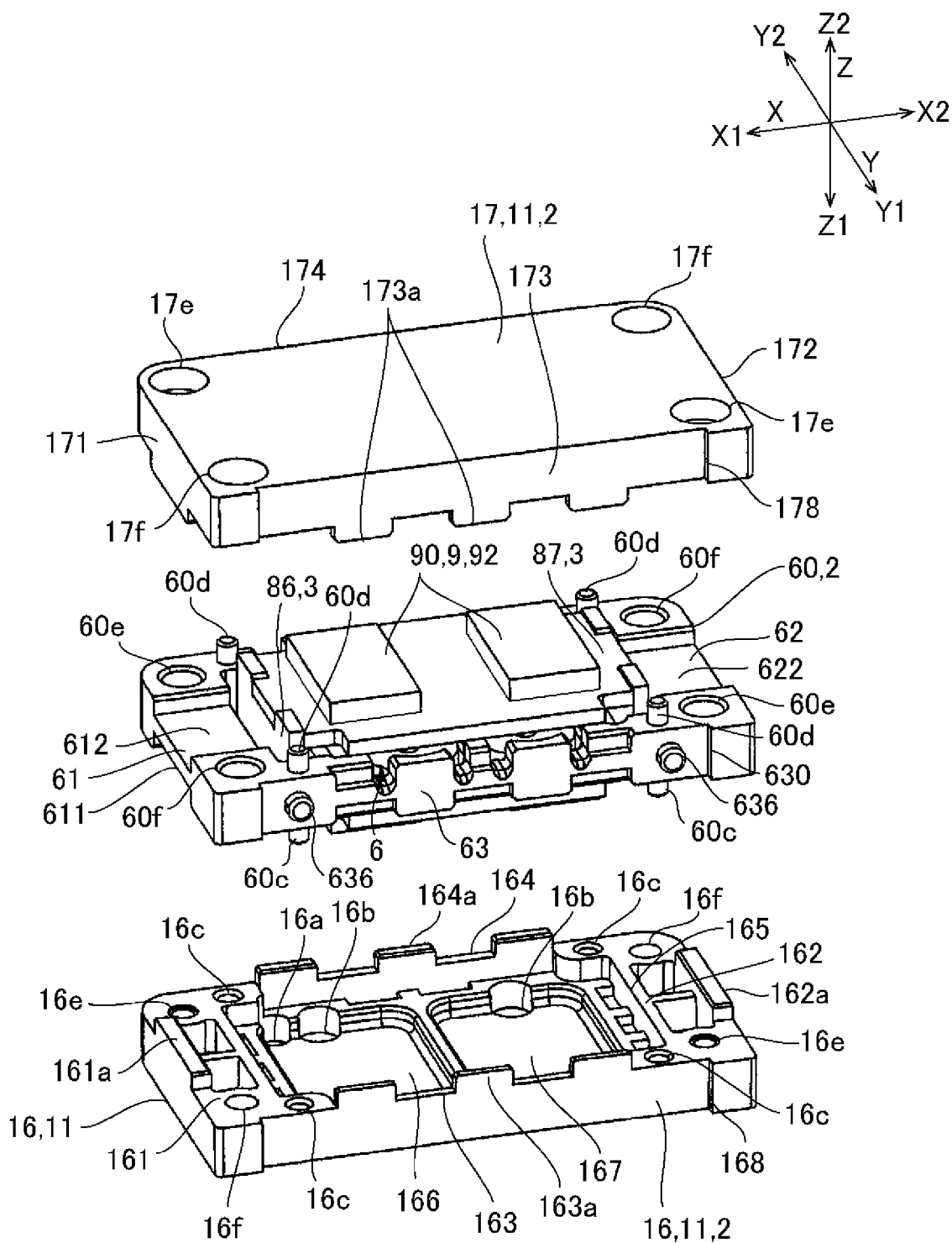
FIG. 4 is an exploded perspective view when the actuator illustrated in FIG. 1 is disassembled and viewed from a different side in a first direction.

FIG. 4 is an exploded perspective view when the actuator 1 illustrated in FIG. 1 is disassembled and viewed from the other side Z2 in the first direction Z. As illustrated in FIGS. 2 and 4, in the first cover member 16, a rectangular recessed part 165 that opens toward the other side Z2 in the first direction Z is formed. In addition, two recessed parts 166 and 167 arranged in the second direction X are formed at the bottom of the recessed part 165. A through hole 16a is formed at a diagonal position of the recessed part 165. That is, in the recessed part 165, the through hole 16a is formed at a corner portion located on a one side X1 in the second direction X and a different side Y2 in the third direction Y and a corner portion located on a different side X2 in the second direction X and a one side Y1 in the third direction Y. Moreover, a through holes 16b is formed at both ends in the third direction Y of the recessed parts 166 and 167.

In the first cover member 16, the recessed part 165 is surrounded by a first wall part 161 located on the one side X1 in the second direction X, a second wall part 162 located on the other side X2 in the second direction X, a third wall part 163 located on the one side Y1 in the third direction Y, and a fourth wall part 164 located on the other side Y2 in the third direction Y. When viewed from the first direction Z, a width of the first wall part 161 and the second wall part 162 (a dimension in the second direction X) is wider than a width of the third wall part 163 and the fourth wall part 164 (a dimension in the third direction Y). In an outer surface of the third wall part 163, a recessed part 168 extending along the second direction X is formed.

In the third wall part 163 and the fourth wall part 164, a plurality of protruding plate parts 163a and 164a protruding along the second direction X to the other side Z2 in the first direction Z are formed at predetermined intervals. In addition, in the first wall part 161 and the second wall part 162, protruding plate parts 161a and 162a protruding from an outer edge to the other side Z2 in the first direction Z are formed in the center in the third direction Y.

At both ends in the second direction X of the third wall part 163 and the fourth wall part 164, a positioning hole 16c opened toward the one side in the first direction Z is formed. In addition, a through hole 16e is formed at one of diagonal positions of the first cover member 16, and a through hole 16f is formed at another diagonal position. That is, in the first cover member 16, the through hole 16e is formed at the corner portion located on the one side X1 in the second direction X and the other side Y2 in the third direction Y and the corner portion located on the other side X2 in the second direction X and the one side Y1 in the third direction Y, and the through hole 16f is formed at the corner portion located on the one side X1 in the second direction X and the one side Y1 in the third direction Y and the corner portion located on the other side X2 in the second direction X and the other side Y2 in the third direction Y.

(Configuration of Second Cover Member 17)

Figure 5:
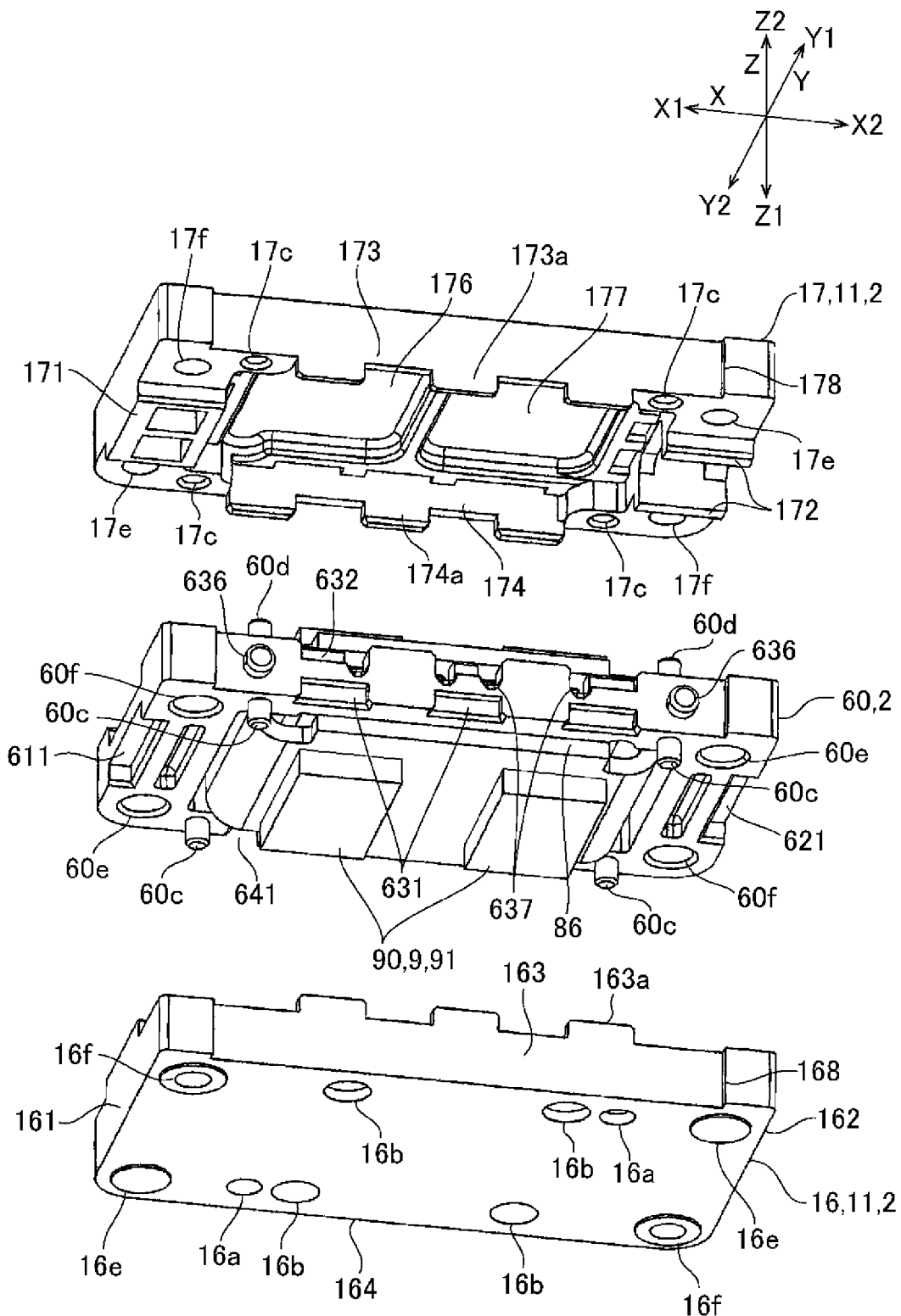
FIG. 5 is an exploded perspective view when the actuator illustrated in FIG. 1 is disassembled and viewed from a one side in the first direction.

FIG. 5 is an exploded perspective view when the actuator 1 illustrated in FIG. 1 is disassembled and viewed from the one side Z1 in the first direction Z. As illustrated in FIGS. 2 and 5, the second cover member 17 is formed substantially symmetrically in the first direction Z with respect to the first cover member 16, as described as follows. First, in the second cover member 17, a rectangular recessed part 175 that opens toward the one side Z1 in the first direction Z is formed. In addition, two recessed parts 176 and 177 arranged in the second direction X are formed at the bottom of the recessed part 175. In the second cover member 17, the recessed part 175 is surrounded by a first wall part 171 located on the one side X1 in the second direction X, a second wall part 172 located on the other side X2 in the second direction X, a third wall part 173 located on the one side Y1 in the third direction Y, and a fourth wall part 174 located on the other side Y2 in the third direction Y. When viewed from the first direction Z, a width of the first wall part 171 and the second wall part 172 (a dimension in the second direction X) is wider than a width of the third wall part 173 and the fourth wall part 174 (a dimension in the third direction Y). In an outer surface of the third wall part 173, a recessed part 178 extending along the second direction X is formed.

In the third wall part 173 and the fourth wall part 174, a plurality of protruding plate parts 173a and 174a protruding along the second direction X to the one side Z1 in the first direction Z are formed at predetermined intervals. In addition, in the first wall part 171 and the second wall part 172, protruding plate parts 171a and 172a protruding from an outer edge to the one side Z1 in the first direction Z are formed at the center in the third direction Y.

At both ends in the second direction X of the third wall part 173 and the fourth wall part 174, a positioning hole 17c opened toward the one side Z1 in the first direction Z is formed. In addition, a through hole 17e is formed at one of diagonal positions of the second cover member 17, and a through hole 17f is formed at another diagonal position. That is, in the second cover member 17, the through hole 17e is formed at the corner portion located on the one side X1 in the second direction X and the other side Y2 in the third direction Y and the corner portion located on the other side X2 in the second direction X and the one side Y1 in the third direction Y, and the through hole 17f is formed at the corner portion located on the one side X1 in the second direction X and the one side Y1 in the third direction Y and the corner portion located on the other side X2 in the second direction X and the other side Y2 in the third direction Y.

(Configuration of Magnetic Drive Circuit 6)

Figure 6:
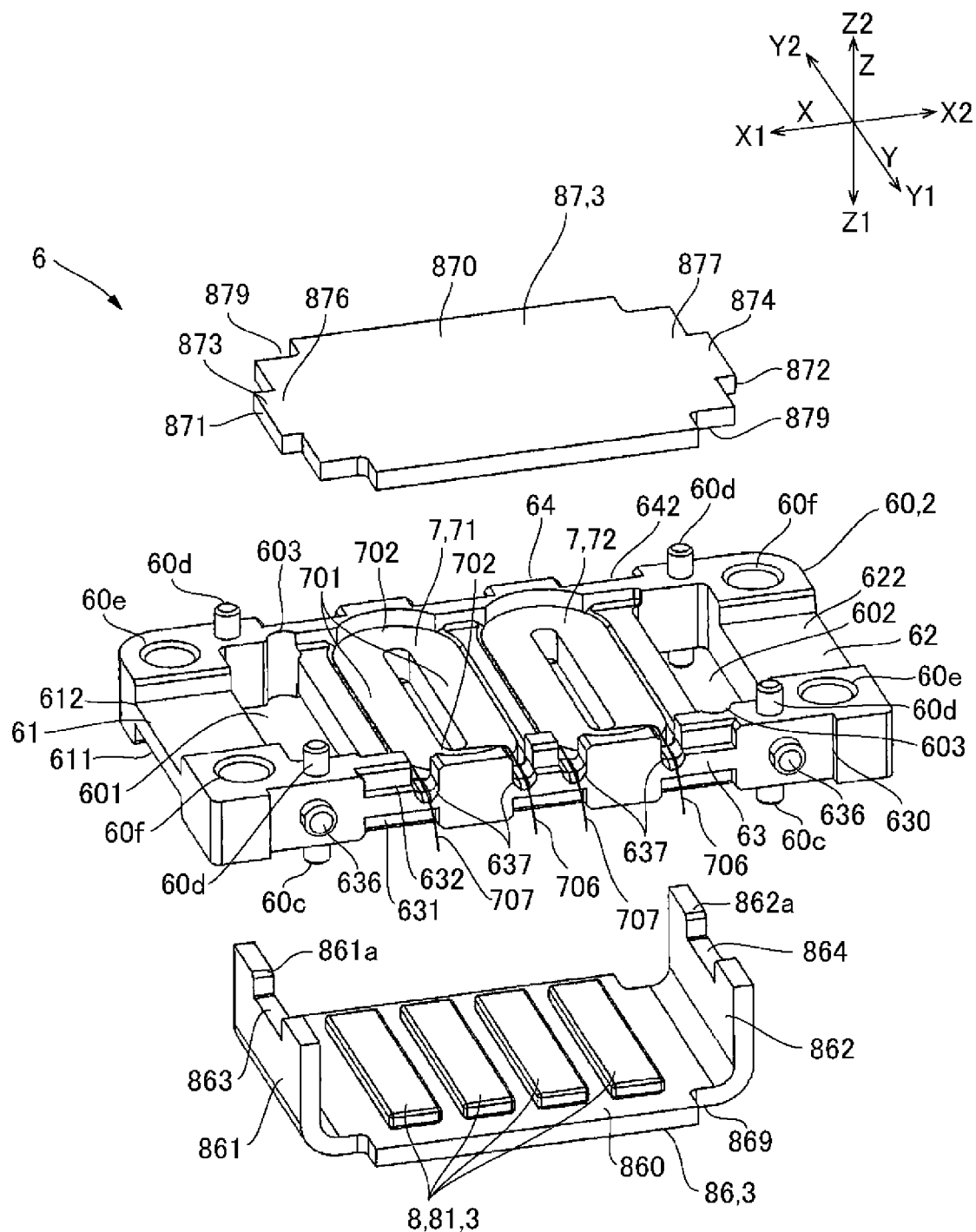
FIG. 6 is an exploded perspective view of a magnetic drive circuit illustrated in FIG. 2.
Figure 7:
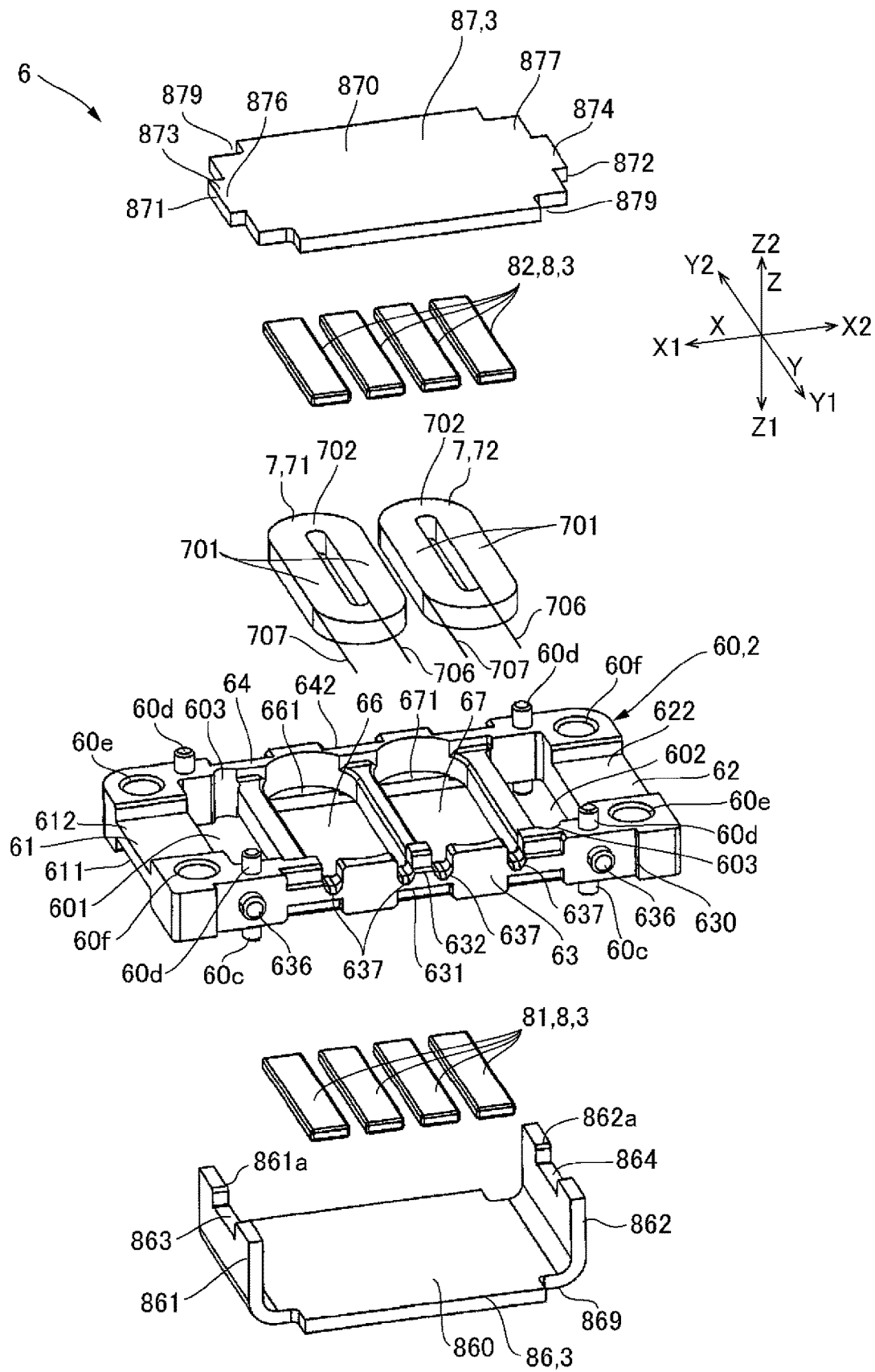
FIG. 7 is an exploded perspective view when the magnetic drive circuit illustrated in FIG. 2 is further finely disassembled.

FIG. 6 is an exploded perspective view of the magnetic drive circuit 6 illustrated in FIG. 2. FIG. 7 is an exploded perspective view when the magnetic drive circuit 6 illustrated in FIG. 2 is further finely disassembled. As illustrated in FIGS. 2, 6 and 7, the magnetic drive circuit 6 includes a coil 7 and a magnet 8 facing the coil 7 in the first direction Z. In this embodiment, the coil 7 is composed of two coils 71 and 72 arranged so as to be in parallel in the second direction X, and the coil 7 is an oval air core coil with a long side 701 (enabled part) extending in the third direction Y. The coil 7 is held by the holder 60 and provided on the support body 2 side.

(Configuration of Holder 60)

As illustrated in FIGS. 2, 5, 6 and 7, the holder 60 is formed in such a manner that two coil holding holes 66 and 67 are arranged in parallel in the second direction X. The coil 7 is disposed in each of the coil holding holes 66 and 67. The coil holding holes 66 and 67 are through holes, and at both ends in the third direction Y, receiving parts 661 and 671 are formed at an end in the one side Z1 in the first direction Z of the coil holding holes 66 and 67. Therefore, when the coil 7 is attached to the coil holding holes 66 and 67 from the other side Z2 in the first direction Z, a short side 702 (disabled part) of the coil 7 is bought to a state of being supported on the one side Z1 in the first direction Z by the receiving parts 661 and 671. In this state, the coil 7 is fixed to the holder 60 with an adhesive or the like.

The holder 60 includes a first wall part 61, a second wall part 62, a third wall part 63, and a fourth wall part 64 in the one side X1 in the second direction X, other side X2 in the second direction X, one side Y1 in the third direction Y, and other side Y2 in the third direction Y, with respect to a portion where the coil holding holes 66 and 67 are formed. When viewed from the first direction Z, a width of the first wall part 61 and the second wall part 62 (a dimension in the second direction X) is wider than a width of the third wall part 63 and the fourth wall part 64 (a dimension in the third direction Y).

In the holder 60, a first opening part 601 is formed between the coil holding hole 66 and the first wall part 61, and a second opening part 602 is formed between the coil holding hole 67 and the second wall part 62. The first opening part 601 and the second opening part 602 penetrate through the holder 60 in the first direction Z.

In the first wall part 61, a recessed part 611 is formed on the one side Z1 in the first direction Z, and a recessed part 612 is formed on the other side Z2 in the first direction Z. The recessed part 611 and 612 are formed at the center in the third direction Y of the first wall 61. In the second wall 62, a recessed part 621 is formed on the one side Z1 in the first direction Z and a recessed part 622 is formed on the other side Z2 in the first direction Z. The recessed parts 621 and 622 are formed at the center in the third direction Y of the second wall part 62. On the outer surface side of the third wall part 63, a plurality of recessed parts 631 are formed along the second direction X, and a plurality of recessed parts 632 are formed along the second direction X on the other side Z2 of the first direction Z. On the outer surface side of the fourth wall part 64, a plurality of recessed parts 641 are formed along the second direction X on the one side Z1 of the first direction Z, and a plurality of recessed parts 642 are formed along the second direction X on the other side Z2 of the first direction Z.

At both ends in the second direction X of the third wall part 63 and the fourth wall part 64, a positioning protruding part 60c that protrudes on the one side Z1 in the first direction Z and a positioning protruding part 60d that protrudes on the other side Z2 in the first direction Z are formed. At both ends in the second direction X of the third wall part 63 and the fourth wall part 64, a notch 603 in which the inner walls of the first opening part 601 and the second opening part 602 are recessed outward is formed.

A through hole 60e is formed at one of diagonal positions of the holder 60, and a through hole 60f is formed at another diagonal position. That is, in the second cover member 17, the through hole 60e is formed at the corner portion located on the one side X1 in the second direction X and the other side Y2 in the third direction Y and the corner portion located on the other X2 in the second direction X and the one side Y1 in the third direction Y, and the through hole 60f is formed at the corner portion located on the one side X1 in the second direction X and the one side Y1 in the third direction Y and the corner portion located on the other side X2 in the second direction X and the other side Y2 in the third direction Y.

In the outer surface of the third wall part 63, a recessed part 630 extending along the second direction X is formed, and, and at both ends of the recessed part 630, a positioning protruding part 636 protruding to the one side Y1 in the third direction Y is formed. In the third wall part 63, four guide grooves 637 extending from the coil holding holes 66 and 67 to the outer surface of the third wall part 63 (the bottom surface of the recessed part 630) are formed.

(Configuration of Support Body 2)

In this embodiment, in a state where the first cover member 16, holder 60 and second cover member 17 are stacked in the first direction Z, a screw 18 is tightened in the through hole 17e of the second cover member 17, the through hole 60e of the holder 60, and the through hole 17e of the second cover member 17, and the first cover member 16, holder 60, and second cover member 17 are fastened in the first direction Z. As a result, the support body 2 is formed.

In doing so, the protruding plate parts 163a and 164a of the first cover member 16 fit into the recessed parts 631 and 641 of the holder 60, and the protruding plate parts 161a and 162a of the first cover member 16 fit into the recessed parts 611 and 621 of the holder 60. In addition, the protruding part 60c of the holder 60 fits into the hole 16c of the first cover member 16. Moreover, the protruding plate parts 173a and 174a of the second cover member 17 fit into the recessed parts 632 and 642 of the holder 60, and the pros 171a and 172a of the second cover member 17 fit into the recessed parts 612 and 622 of the holder 60. Furthermore, the protruding part 60d of the holder 60 fits into the hole 17c of the second cover member 17. In this way, the first cover member 16, holder 60 and second cover member 17 are connected in a state of being positioned with respect to one another. In addition, the guide groove 637 opens as a hole 638 between the holder 60 and the second cover member 17.

In the through hole 16f of the first cover member 16, the through hole 60f of the holder 60, and the through hole 17f of the second cover member 17, a screw 19 to be tightened to a frame of a device is tightened. In this embodiment, when the screws 18 and 19 are tightened, the heads of the screws 18 and 19 do not protrude from the second cover member 17 to the other side Z2 in the first direction Z.

(Processing of End of the Coil 7)

In the actuator 1 configured as described above, as illustrated in FIGS. 1 and 2, the cover 11 used for the support body 2 includes, in the outer surface side 110, a first side surface 111 located on the one side X1 in the second direction X, a second side surface 112 located on the other side X2 in the second direction X, and a third side surface 113 located on the one side Y1 in the third direction Y, and a fourth side surface 114 located on the other side Y2 in the third direction Y. Here, a length in the second direction X of the third side surface 113 and the fourth side surface 114 is longer than a length in the third direction Y of the first side surface 111 and the second side surface 112. In this embodiment, a wiring board 15 to which a first end 706 at the beginning of winding and a second end 707 at the end of winding of a coil wire constituting the coil 7 are each electrically connected is fixed to the third side surface 113.

In this embodiment, since the guide groove 637 is formed in the holder 60, when fixing to the coil holding holes 66 and 67 of the holder 60, the first end 706 at the beginning of winding and the second end 707 at the end of winding are pulled out to the outside through the guide groove 637, and then the first cover member 16, holder 60 and second cover member 17 are stacked and connected in the first direction Z. As a result, the first end 706 and the second end 707 are brought to a state of being pulled out from the hole 638.

Therefore, after the first cover member 16, holder 60, and second cover member 17 are stacked and connected in the first direction Z, the wiring board 15 can be fixed to the recessed parts 168, 630, and 178. In doing so, the protruding part 636 of the holder 60 is fitted into a positioning hole 155 of the wiring board 15 to position the wiring board 15, and then the wiring board 15 is fixed with an adhesive or the like. Accordingly, the coil 7 can be driven from the outside via the wiring board 15. Here, since a notch 150 that brings the hole 638 to an open state is formed in the wiring board 15, the first end 706 and the second end 707 pulled out from the hole 638 are extended to each of lands 151 of the wiring board 15 through the notch 150 and soldered to the lands 151. As a result, two coils 7 are electrically connected in series. The two coils 7 may be electrically connected in parallel.

(Configuration of Movable Body 3)

As illustrated in FIGS. 2, 4, 5, 6 and 7, the movable body 3 includes a first yoke 86 including a first plate part 860 facing the coil 7 on the one side Z1 in the first direction Z and a second yoke 87 including a second plate part 870 facing the coil 7 on the other side Z2 in the first direction Z. The magnet 8 is held in at least one of a surface of the first plate part 860 of the first yoke 86 facing the coil 7 and a surface of the second plate part 870 of the second yoke 87 facing the coil 7, and faces the coil 7 in the first direction Z.

In this embodiment, as the magnet 8, a first magnet 81 fixed to the surface of the first plate part 860 of the first yoke 86 facing the coil 7 by a method such as adhesion and a second magnet 82 fixed to the surface of the second plate part 870 of the second yoke 87 facing the coil 7 by a method such as adhesion are provided. In this state, the first magnet 81 faces the long side 701 of the coil 7 on the one side Z1 in the first direction Z, and the second magnet 82 faces the long side 701 of the coil 7 on the other side Z2 in the first direction Z. The first magnet 81 and the second magnet 82 are each polarized and magnetized in a thickness direction (the first direction Z), and the surface facing the coil 7 in the first magnet 81 and the surface facing the coil 7 in the second magnet 82 are magnetized to different poles. In this embodiment, the first magnet 81 and the second magnet 82 are each composed of four magnets facing each of total four long sides 701 of two coils 7 (coils 71 and 72).

In this embodiment, the first yoke 86 includes: a first connecting plate part 861 that extends from the first plate part 860 toward the other side Z2 in the first direction Z to a position overlapping the second yoke 87 and that is connected to the second yoke 87; and a second connecting plate part 862 that extends from the first plate part 860 toward the other side Z2 in the first direction Z to a position overlapping the second yoke 87 and that is connected to the second yoke 87, on a side opposite to the first connecting plate part 861 with respect to the first magnet 81. The first connecting plate part 861 and the second connecting plate part 862 are each bent toward the other side Z2 in the first direction Z from an end located on opposite sides in the second direction X in the first plate part 860. Thus, the first connecting plate part 861 extends toward the other side Z2 in the first direction Z through the one side X1 in the second direction X with respect to the coil 7, and the second connecting plate part 862 extends toward the other side Z2 in the first direction Z through the other side X2 in the second direction X with respect to the coil 7. In doing so, the first connecting plate part 861 extends toward the other side Z2 in the first direction Z through the first opening part 601 of the holder 60 on the one side X1 in the second direction X with respect to the coil 7, and the second connecting plate part 862 extends toward the other side Z2 in the first direction Z through the second opening part 602 of the holder 60 on the other side X2 in the second direction X with respect to the coil 7.

In this embodiment, the first connecting plate part 861 and the second connecting plate part 862 are connected to an end of the second yoke 87 by welding. More specifically, an end 861a on the other side Z2 in the first direction Z of the first connecting plate part 861 overlaps a first side surface 871 of the second plate part 870 of the second yoke 87, and the first connecting plate part 861 and the first side surface 871 of the second yoke 87 are welded. Similarly, an end on the other side Z2 in the first direction Z of the second connecting plate part 862 overlaps a second side surface 872 of the second plate part 870 of the second yoke 87, and the second connecting plate part 862 and the second side surface 872 of the second yoke 87 are welded.

In one of the end 861a of the first connecting plate part 861 and the first side surface 871, a protruding part fitted into a recessed part formed on the other is formed, and in one of the end 862a of the second connecting plate part 862 and the second side surface 872, a protruding part fitted into a recessed part formed on the other is formed. In this embodiment, a protruding part 873 formed on the second plate part 870 is fitted and welded into a recessed part 863 formed on the end 861a of the first connecting plate part 861, and a protruding part 874 formed on the second plate part 870 is fitted and welded into a recessed part 864 formed on the end 862a of the second connecting plate part 862.

(Assembly Process of Actuator 1)

Figure 8:
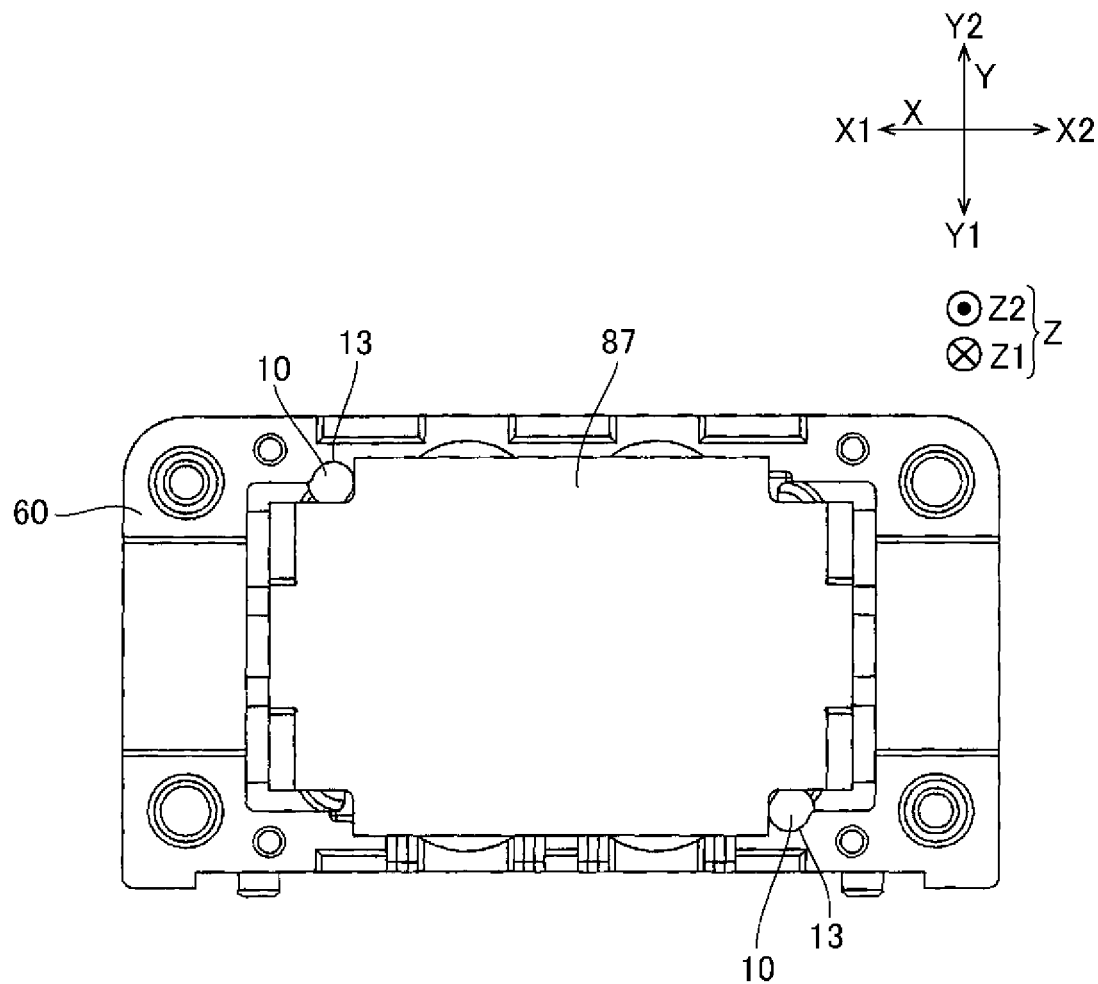
FIG. 8 is a plan view of a state where a first cover member, a first yoke, a holder, and a second yoke illustrated in FIG. 2 are stacked in the first direction.

FIG. 8 is a plan view of a state where the first cover member 16, first yoke 86, holder 60, and second yoke 87 illustrated in FIG. 2 are stacked in the first direction Z. In this embodiment, in the first yoke 86, a width of the first connecting plate part 861 and the second connecting plate part 862 in the third direction Y is narrower than a width in the third direction Y of the first plate part 860, and at least there is a notch 869 in a portion that overlaps the through hole 16a of the first cover member 16 and the notch 603 of the holder 60. In addition, in the second yoke 87, a width in the third direction Y of parts 876 and 877 connected to the first connecting plate part 861 and the second connecting plate part 862 is narrower than a width in the third direction Y of the second plate part 870, and at least there is a notch 879 in a portion that overlaps the through hole 16a of the first cover member 16 and the notch 603 of the holder 60. Therefore, when the first cover member 16, first yoke 86, holder 60, and second yoke 87 are stacked in the first direction Z, as illustrated in FIG. 8, a through hole 13 is formed by the through hole 16a of the first cover member 16, the notch 869 of the first yoke 86, the notch 603 of the holder 60, and the notch 879 of the second yoke 87.

Consequently, if a positioning pin 10 is passed through the through hole 16a of the first cover member 16, when the first yoke 86, holder 60, and second yoke 87 are sequentially stacked in the first direction Z, the notch 869 of the first yoke 86, the notch 603 of the holder 60, and the notch 879 of the second yoke 87 can be positioned with reference to the positioning pin 10, and thus, the first cover member 16, first yoke 86, holder 60, and second yoke 87 can be properly stacked in the first direction Z.

(Configuration of Stopper)

As illustrated in FIG. 2, in this embodiment, on the one side X1 in the second direction X with respect to the first connecting plate part 861 of the first yoke 86 used for the movable body 3, the inner surfaces of the first wall part 161 of the first cover member 16, the first wall part 61 of the holder 60, and the first wall part 171 of the second cover member 17 face one another in a state of constituting a continuous flat surface (first contacted part 118). Therefore, the first connecting plate part 861 constitutes a first stopper that contacts the first contacted part 118 to restrict a movable range of the movable body 3 to the one side X1 in the second direction X when the movable body 3 moves to the one side X1 in the second direction X.

Similarly, on the other side X2 in the second direction X with respect to the second connecting plate part 862, the inner surfaces of the second wall part 162 of the first cover member 16, the second wall part 62 of the holder 60, and the second wall part 172 of the second cover member 17 face one another in a state of constituting a continuous flat surface (second contacted part 119). Therefore, the second connecting plate part 862 constitutes a second stopper that contacts the first contacted part 119 to restrict a movable range of the movable body 3 to the other side X2 in the second direction X when the movable body 3 moves to the other side X2 in the second direction X.

(Configuration of Connection Body 90 and Viscoelastic Member 9)

As illustrated in FIGS. 2, 4 and 5, the support body 2 and the movable body 3 are provided with a connection body 90 having at least one of elasticity and viscoelasticity. In this embodiment, the connection body 90 is a viscoelastic member 9 provided at a location where the support body 2 and the movable body 3 face each other in the first direction Z, and is elastically deformable in the first direction Z, second direction X, and third direction Y. Viscoelasticity is a property that combines both viscosity and elasticity, and is a property that is prominently found in polymer materials such as gel-like members, plastics, and rubbers. Therefore, various gel-like members can be used as the viscoelastic member 9. In addition, as the viscoelastic member 9, various rubber materials such as natural rubber, diene-based rubber (for example, styrene-butadiene rubber, isoprene rubber, butadiene rubber, chloroprene rubber, acrylonitrile-butadiene rubber, etc.), non-diene rubber (for example, butyl rubber, ethylene-propylene rubber, ethylene-propylene-diene rubber, urethane rubber, silicone rubber, fluorine rubber, etc.), and a thermoplastic elastomer and their modified materials may be used.

In this embodiment, only the viscoelastic member 9 is connected to both the support body 2 and the movable body 3 as the connection body 90. In this embodiment, as the viscoelastic member 9, a first viscoelastic member 91 is disposed at a location where the first yoke 86 of the movable body 3 and the first cover member 16 of the support body 2 face each other in the first direction Z, and a second viscoelastic member 92 is disposed at a location where the second yoke 87 of the movable body 3 and the second cover member 17 of the support body 2 face each other in the first direction Z. More specifically, two first viscoelastic members 91 are disposed between the first plate part 860 of the first yoke 86 and the bottoms of the recessed parts 166 and 167 of the first cover member 16, and two viscoelastic members 92 are disposed between the second plate part 870 of the second yoke 87 and the bottoms of the recessed parts 176 and 177 of the second cover member 17.

Here, the first viscoelastic member 91 is disposed in a compressed state in the first direction Z between the first plate part 860 of the first yoke 86 and the bottoms of the recessed parts 166 and 167 of the first cover member 16, and the second viscoelastic member 92 is disposed in a compressed state in the first direction Z between the second plate part 870 of the second yoke 87 and the bottoms of the recessed parts 176 and 177 of the second cover member 17. The first viscoelastic member 91 is bonded to a surface that is in contact with the support body 2 (the bottoms of the recessed parts 166 and 167 of the first cover member 16), and is bonded to a surface that is in contact with the movable body 3 (the first yoke 86). The second viscoelastic member 92 is bonded to a surface that is in contact with the support body 2 (the bottoms of the recessed parts 176 and 177 of the second cover member 17), and is bonded to a surface that is in contact with the movable body 3 (the second yoke 87).

In this embodiment, the viscoelastic member 9 (the first viscoelastic member 91 and the second viscoelastic member 92) is a silicone-based gel having a rate of penetration of 10 to 110 degrees. The rate of penetration is specified in JIS-K-2220 and K-2207, and the smaller this value, the harder the viscoelastic member 9 is. The viscoelastic member 9 has a linear or non-linear expansion/contraction property depending on an expansion/contraction direction. For example, when compressed in a thickness direction (axial direction) and compressively deformed, the viscoelastic member 9 has an expansion/contraction property in which a non-linear component (spring coefficient) is larger than a linear component (spring coefficient). On the contrary, when stretched by being pulled in the thickness direction (axial direction), the viscoelastic member 9 has an expansion/contraction property in which a linear component (spring coefficient) is larger than a non-linear component (spring coefficient). Meanwhile, as in this embodiment, in a case where the viscoelastic member 9 deforms in a direction (shear direction) intersecting the thickness direction (axial direction), since the deformation is in a direction of being pulled and stretched regardless of a direction of movement, the viscoelastic member 9 has a deformation property in which a linear component (spring coefficient) is larger than a non-linear component (spring coefficient). Therefore, the viscoelastic member 9 has a constant spring force due to the direction of movement. Consequently, the reproducibility of vibration acceleration for an input signal can be improved by using a spring element in the shear direction of the viscoelastic member 9 as in this embodiment, and thus a vibration with a subtle nuance can be achieved.

(Basic Operation)

When an alternating current is applied to the coil 7 in the actuator 1 of this embodiment, the movable body 3 vibrates in the second direction X, and thus the center of gravity in the actuator 1 fluctuates in the second direction X. Thus, a user can experience vibration in the second direction X. In doing so, as long as an AC waveform applied to the coil 7 is adjusted and an acceleration that the movable body 3 moves to the one side X1 in the second direction X and an acceleration that the movable body 3 moves to the other side X2 in the second direction X are thereby made different, the user can experience vibration with directionality in the second direction X.

(Main Effects of this Embodiment)

Next, the main effects of this embodiment will be described. As described above, the embodiments of the first aspect of the invention, second aspect of the invention, third aspect of the invention, and fourth aspect of the invention are the same embodiment.

As described above, in the actuator 1 of this embodiment, the first yoke 86 and the second yoke 87 are disposed on both sides in the first direction Z across the coil 7, and the first magnet 81 and the second magnet 82 are fixed to the first yoke 86 and the second yoke 87. Even in such a configuration, in this embodiment, the first yoke 86 includes the first connecting plate part 861 and the second connecting plate part 862 extending toward the second yoke 87, and thus the first connecting plate part 861 and the second yoke 87 can be connected, and the second connecting plate part 862 and the second yoke 87 can be connected on the other side Z2 in the first direction Z (the side where the second yoke 87 is located). Consequently, a yoke in which the magnet 8 is fixed to the surfaces facing each other in the first plate part 860 and the second plate part 870 can be efficiently manufactured. In particular in this embodiment, since the first connecting plate part 861 and the second connecting plate part 862 are connected to the second yoke 87 by welding, the welding work is needed only in the other side Z2 in the first direction Z, and thus the welding work can be efficiently performed.

In addition, the first connecting plate part 861 and the second connecting plate part 862 are each bent toward the other side Z2 in the first direction Z from an end located on opposite sides in the first plate part 860, and thus the yoke 86 can be efficiently manufactured. Moreover, the protruding part 873 formed on the second plate part 870 is fitted and welded into the recessed part 863 formed on the end 861a of the first connecting plate part 861, and the protruding part 874 formed on the second connecting plate part 862 is fitted and welded into the recessed part 864 formed on the end 862a of the second connecting plate part 862. Thus, the first yoke 86 and the second yoke 87 can be joined together in a state of being positioned by the recessed parts 863 and 864 and the protruding parts 873 and 874.

In addition, the first contacted part 118 and the second contacted part 119 that restrict the movable range when the movable body 3 moves in the second direction X are composed of the first wall part having a wide width (the first wall part 161 of the first cover member 16, the first wall part 61 of the holder 60, and the first wall part 171 of the second cover member 17) and the second wall part (the second wall part 162 of the first cover member 16, the second wall part 62 of the holder 60, and the second wall part 172 of the second cover member 17). Thus, the strength of the first contacted part 118 and the second contacted part 119 is large, and thus even if the movable body 3 rapidly moves in the second direction X due to an impact when dropped or the like, the first contacted part 118 and the second contacted part 119 are not easily damaged.

Moreover, in this embodiment, since the viscoelastic member 9 is disposed in the portion where the support body 2 and the movable body 3 face each other in the first direction Z, the resonance when the movable body 3 is driven is suppressed by the viscoelastic member 9. In doing so, since the viscoelastic member 9 is deformed in the shear direction, the viscoelastic member 9 has a deformation property in which a linear component is larger than a non-linear component. Therefore, the reproducibility of vibration acceleration for an input signal can be improved, and thus vibration can be achieved with a subtle nuance. In addition, in this embodiment, the support body 2 includes a plurality of members (the first cover member 16, holder 60, and second cover member 17) stacked in the first direction Z, and thus an interval between the locations where the support body 2 and the movable body 3 face each other in the first direction Z is likely to vary. However, since the viscoelastic member 9 is disposed in a compressed state in the first direction Z, the viscoelastic member 9 is always in contact with the support body 2 and the movable body 3. Thus, the viscoelastic member 9 reliably follows the movement of the movable body 3. In addition, the surface of the viscoelastic member 9 in contact with the support body 2 is bonded to the support body 2, and the surface in contact with the movable body 3 is bonded to the movable body 3, and thus the position of the viscoelastic member 9 is difficult to shift. Therefore, the viscoelastic member 9 reliably follows the movement of the movable body 3.

In addition, the first cover member 16, holder 60, and second cover member 17 are fastened in the first direction Z by the screw 18 having the screw shaft extending in the first direction Z. Therefore, the viscoelastic member 9 can be compressed in the first direction Z when fastening the first cover member 16, holder 60, and second cover member 17 by tightening the screw 18. Moreover, the portions with which the viscoelastic member 9 contacts in the first cover member 16 and the second cover member 17 of the support body 2 are the recessed parts 166, 167, 176, and 177, and thus the position of the viscoelastic member 9 is difficult to shift.

In addition, since the first end 706 and the second end 707 of the coil wire used for the coil 7 are in the state of being electrically connected to the wiring board 15 fixed to the support body 2, a situation where the first end 706 and the second end 707 of the coil wire are pulled and the coil 7 is damaged is hard to occur. Moreover, the wiring board 15 is fixed to the third side surface 113 corresponding to the long side when viewed from the first direction Z among the side surfaces of the support body 2, and thus it is possible to use the wiring board 15 having a long dimension. Thus, regardless of the orientation, position, number, or the like of the coil 7, even if the first end 706 and second end 707 of the coil 7 are not routed over a long distance, the ends of the coil 7 can be properly processed, such as being easily electrically connected to the wiring board 15.

Furthermore, the hole 638 through which the first end 706 and the second end 707 are passed is formed in the third side surface 113 of the support body 2, and the hole 638 is connected to the guide groove 637 of the holder 60. Thus, the first end 706 and the second end 707 can be guided to the wiring board 15 through the guide groove 637 and the hole 638, and therefore it is easy to route the first end 706 and the second end 707 to the wiring board 15.

Other Embodiments

In the above embodiment, while the two magnets 8 (the first magnet 81 and the second magnet 82) are provided, the present invention may be applied to a case of an aspect in which, for example, the magnet 8 is disposed only on the one side Z1 in the first direction Z with respect to the coil 7, and only the second yoke 87 is present on the other side Z2 in the first direction Z.

In the above embodiment, while the gel-like member such as a silicone-based gel is used as the viscoelastic member 9, rubber or the like may be used as the viscoelastic member. In addition, in the above embodiment, while the viscoelastic member 9 is used as the connection body 90, an elastic member such as a spring may be used.

In the above embodiment, while the coil and the holder are provided on the support body 2 and the magnet and the yoke are provided on the movable body 3, the present invention may be applied to a case where the coil and the holder are provided on the movable body 3 and the magnet and the yoke are provided on the support body 2. In the above embodiment, while the present invention is applied to the actuator 1 that drives the movable body 3 only in the second direction X, the present invention may be applied to the actuator 1 that drives the movable body 3 in the second direction X and the third direction Y.

What is claimed is:

1. An actuator comprising:
   a support body;
   a movable body;
   a connection body, connected to the movable body and the support body, and the connection body having at least one of elasticity and viscoelasticity; and
   a magnetic drive circuit for relatively moving the movable body with respect to the support body,
   wherein the magnetic drive circuit comprises:
      a coil, provided on an either one side member of the support body and the movable body; and
      a first magnet, provided on a different side member of the support body and the movable body and facing the coil in a first direction, and
      the magnetic drive circuit drives the movable body in a second direction intersecting the first direction;
   wherein the different side member comprises:
      a first yoke, including a first plate part facing the coil on a one side in the first direction; and
      a second yoke, including a second plate part facing the coil on a different side in the first direction,
   wherein the first magnet is fixed to one of a surface of the first plate part facing the coil and a surface of the second plate part facing the coil, and
   wherein the first yoke comprises:
      a first connecting plate part that extends from the first plate part toward the different side in the first direction to a position overlapping the second yoke and that is connected to the second yoke; and
      a second connecting plate part that extends from the first plate part toward the different side in the first direction to a position overlapping the second yoke and that is connected to the second yoke, on a side opposite to the first connecting plate part with respect to the first magnet;
   wherein the support body further comprises:
      a first wall part facing the movable body on a one side in the second direction;
      a second wall part facing the movable body on a different side in the second direction;
      a holder holding the coil or the first magnet;
      a first cover member whose ends overlap each other on a one side in the first direction with respect to the holder; and
      a second cover member whose ends overlap each other on a different side in the first direction with respect to the holder,
   wherein the first wall part and the second wall part each comprise a portion where the holder, the first cover member, and the second cover member overlap in the first direction.

2. The actuator according to claim 1, wherein
the first connecting plate part and the second connecting plate part are each bent from an end located on opposite sides of the first plate part toward the different side in the first direction.

3. The actuator according to claim 1, wherein
the magnetic drive circuit comprises a second magnet,
wherein the second magnet is fixed to one of the surfaces of the first plate part facing the coil and the surface of the second plate part facing the coil opposite to the first magnet.

4. The actuator according to claim 1, wherein
the first connecting plate part and the second connecting plate part are connected to the second yoke by welding.

5. The actuator according to claim 4,
wherein an end on the different side in the first direction of the first connecting plate part overlaps a first side surface of the second plate part, and the first connecting plate part and the first side surface of the second yoke are welded, and
wherein an end on the different side in the first direction of the second connecting plate part overlaps a second side surface of the second plate part, and the second connecting plate part and the second side surface of the second yoke are welded.

6. The actuator according to claim 5,
wherein, in either one of the end on the different side in the first direction of the first connecting plate part and the first side surface, a protruding part fitted and welded into a recessed part formed on the other is formed, and
wherein, in either one of the end on the different side in the first direction of the second connecting plate part and the second side surface, a protruding part fitted and welded into a recessed part formed on the other is formed.

7. The actuator according to claim 1,
wherein the first connecting plate part extends toward the different side in the first direction through a one side in the second direction with respect to the coil, and
wherein the second connecting plate part extends toward the different side in the first direction through a different side in the second direction with respect to the coil.

8. The actuator according to claim 1,
wherein the coil is held in the holder,
wherein the first connecting plate part constitutes a first stopper that contacts the holder to restrict a movable range of the movable body to a one side in the second direction when the movable body moves to the one side in the second direction, and
wherein the second connecting plate part constitutes a second stopper that contacts the holder to restrict a movable range of the movable body to a different side in the second direction when the movable body moves to the different side in the second direction.

9. An actuator comprising:
   a support body;
   a movable body;
   a plurality of viscoelastic members, connected to the movable body and the support body; and
   a magnetic drive circuit that comprises a coil and a magnet facing the coil in a first direction, and that relatively moves the movable body with respect to the support body in a second direction intersecting the first direction,
   wherein the plurality of viscoelastic member are disposed in a state of being compressed in the first direction at locations where the support body and the movable body face each other in the first direction,
   wherein the support body comprises, as a plurality of members:
      a first wall part facing the movable body on a one side in the second direction;

a second wall part facing the movable body on a different side in the second direction;
a holder holding a coil or a magnet that constitutes the magnetic drive circuit;
a first cover member whose ends overlap each other on a one side in the first direction with respect to the holder; and
a second cover member whose ends overlap each other on a different side in the first direction with respect to the holder,
wherein the plurality of viscoelastic member are provided between the movable body and the first cover member and between the movable body and the second cover member;
wherein the first wall part and the second wall part each comprise a portion where the holder, the first cover member, and the second cover member overlap in the first direction.

10. The actuator according to claim 9, wherein
the first cover member, the holder, and the second cover member are fastened in the first direction by a screw having a screw shaft extending in the first direction.

11. An actuator comprising:
a support body;
a movable body;
a connection body, connected to the movable body and the support body, and the connection body having at least one of elasticity and viscoelasticity; and
a magnetic drive circuit that comprises a coil and a first magnet facing the coil in a first direction, and that relatively moves the movable body with respect to the support body in a second direction intersecting the first direction,
wherein the support body comprises:
a first wall part facing the movable body on a one side in the second direction;
a second wall part facing the movable body on a different side in the second direction;
a third wall part facing the movable body on a one side in a third direction intersecting the first direction and the second direction; and
a fourth wall part facing the movable body on a different side in the third direction,
wherein a width in the second direction of the first wall part and the second wall part is wider than a width in the third direction of the third wall part and the fourth wall part,
wherein the first wall part comprises a first contacted part that contacts the movable body to restrict a movable range of the movable body to a one side in the second direction when the movable body moves to the one side in the second direction, and
wherein the second wall part comprises a second contacted part that contacts the movable body to restrict a movable range of the movable body to a different side in the second direction when the movable body moves to the different side in the second direction;
wherein the support body further comprises:
a holder holding the coil or the first magnet;
a first cover member whose ends overlap each other on a one side in the first direction with respect to the holder; and
a second cover member whose ends overlap each other on a different side in the first direction with respect to the holder, and wherein the first wall part and the second wall part each comprise a portion where the holder, the first cover member, and the second cover member overlap in the first direction.

12. The actuator according to claim 11,
wherein the holder and the first cover member are formed with a positioning protruding part that protrudes from either one of the holder and the first cover member toward the other and fits into a positioning hole formed on the other, and
wherein the holder and the second cover member are formed with a positioning protruding part that protrudes from either one of the holder and the second cover member toward the other and fits into a positioning hole formed on the other.

13. The actuator according to claim 11,
wherein the coil is provided on a side of the support body in a state of being held by the holder,
wherein the first magnet is provided on the movable body,
wherein the movable body comprises: a first yoke including a first plate part facing the coil on the one side in the first direction, and a second yoke including a second plate part facing the coil on the different side in the first direction,
wherein the first magnet is fixed to one of a surface of the first plate part facing the coil and a surface of the second plate part facing the coil, and
wherein the first yoke comprises:
a first connecting plate part that extends from the first plate part toward the different side in the first direction to a position overlapping the second yoke and that is connected to the second yoke, on the one side in the second direction with respect to the coil; and
a second connecting plate part that extends from the first plate part toward the different side in the first direction to a position overlapping the second yoke and that is connected to the second yoke, on the different side in the second direction with respect to the coil,
wherein the first connecting plate part contacts the first wall part to restrict a movable range of the movable body to the one side in the second direction when the movable body moves to the one side in the second direction, and
wherein the second connecting plate part contacts the second wall part to restrict a movable range of the movable body to the different side in the second direction when the movable body moves to the different side in the second direction.

14. The actuator according to claim 13, wherein the holder is formed with:
a first opening part that allows the first connecting plate part to pass through from the one side toward the different side in the first direction, between the coil and the first wall part; and
a second opening part that allows the second connecting plate part to pass through from the one side toward the different side in the first direction, between the coil and the second wall part.

15. The actuator according to claim 13, wherein
the magnetic drive circuit comprises a second magnet which is fixed to the surface of the first plate part facing the coil and a different side of the surface of the second plate part facing the coil.

16. The actuator according to claim 13, wherein
a through hole is formed through the first cover member, the first yoke, the holder, and the second yoke, in a state where the first cover member, the first yoke, the holder, and the second yoke are stacked in the first direction.

17. An actuator comprising:
a support body;
a movable body;
a connection body, connected to the movable body and the support body and having at least one of elasticity and viscoelasticity; and
a magnetic drive circuit that comprises a coil and a first magnet facing the coil in a one side in a first direction, and that relatively moves the movable body with respect to the support body in a second direction intersecting the first direction,
wherein the support body comprises, on an outer surface side:
a first side surface located on a one side in the second direction;
a second side surface located on a different side in the second direction;
a third side surface which is located on a one side in a third direction intersecting the first direction and the second direction, a length in the second direction of which being longer than a length in the third direction of the first side surface and the second side surface; and
a fourth side surface which is located on a different side in the third direction, a length in the second direction of which being longer than the length in the third direction of the first side surface and the second side surface, and
wherein a wiring board to which a first end at the beginning of winding and a second end at the end of winding of a coil wire constituting the coil are each electrically connected is fixed to the third side surface;
wherein the coil is held in a holder, and
wherein a guide groove through which the first end and the second end each pass is formed at an end in a one side in the third direction of the holder.

18. The actuator according to claim 17,
wherein the coil is disposed in such a manner that a long side extends in the third direction, and
wherein the magnetic drive circuit drives the movable body in the second direction.

19. The actuator according to claim 18, wherein
a plurality of the coils are arranged so as to be in parallel in the second direction.

* * * * *